United States Patent
Fang et al.

(10) Patent No.: US 12,543,076 B2
(45) Date of Patent: Feb. 3, 2026

(54) ENHANCED Wi-Fi FAST ROAMING TRANSITION FOR MOBILE DEVICES

(71) Applicant: Intel Corporation, Santa Clara, CA (US)

(72) Inventors: Juan Fang, Portland, OR (US); Necati Canpolat, Beaverton, OR (US); Laurent Cariou, Milizac (FR); Dave Cavalcanti, Portland, OR (US); Cheng Chen, Camas, WA (US); Dibakar Das, Hillsboro, OR (US); Roya Doostnejad, Los Altos, CA (US); Po-Kai Huang, San Jose, CA (US); Minyoung Park, San Ramon, CA (US); Ganesh Venkatesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 17/645,842

(22) Filed: Dec. 23, 2021

(65) Prior Publication Data
US 2022/0116833 A1    Apr. 14, 2022

(51) Int. Cl.
*H04W 36/00*    (2009.01)
*H04W 12/06*    (2021.01)
(Continued)

(52) U.S. Cl.
CPC ....... *H04W 36/0038* (2013.01); *H04W 12/06* (2013.01); *H04W 36/0027* (2013.01);
(Continued)

(58) Field of Classification Search
CPC ............................. H04W 84/12; H04L 63/105
(Continued)

(56) References Cited

U.S. PATENT DOCUMENTS 9,820,199 B2 * 11/2017 McCann ........... H04W 36/1446
10,856,143 B2 * 12/2020 Cherian ............ H04W 28/0205
(Continued)

FOREIGN PATENT DOCUMENTS

DE    102021111633 A1    11/2021
EP       3174364 A1     5/2017
(Continued)

OTHER PUBLICATIONS

Extended European Search Report issued May 8, 2023 in EP Application No. 22202676.7, 12 pages.

*Primary Examiner* — Margaret G Webb
(74) *Attorney, Agent, or Firm* — Gray Ice Higdon, PLLC

(57) ABSTRACT

This disclosure describes systems, methods, and devices related to fast transition Wi-Fi roaming operations. A device may generate, during a first association of the device to a first access point, a request to authenticate the device to a second access point; send, during the first association, the request to authenticate; receive, during the first association, a response indicating that the device is authenticated to the second access point; generate, during the first association, a reassociation request to the second access point; determine that a time between sending the request to authenticate and generating the reassociation request is less than a threshold time; send, based on the determination that the time is less than the threshold time, the reassociation request to the second access point; and receive a reassociation response indicative of a second association of the device to the second access point.

8 Claims, 16 Drawing Sheets

(51) Int. Cl.
  *H04W 36/08* (2009.01)
  *H04W 84/12* (2009.01)
(52) U.S. Cl.
  CPC ..... *H04W 36/00692* (2023.05); *H04W 36/08* (2013.01); *H04W 84/12* (2013.01)
(58) Field of Classification Search
  USPC .................................. 370/338, 329; 455/519
  See application file for complete search history.

(56) References Cited

U.S. PATENT DOCUMENTS

| | | | |
|---|---|---|---|
| 2013/0203384 A1* | 8/2013 | Narasimhan | H04L 63/0227 |
| | | | 455/411 |
| 2020/0045755 A1* | 2/2020 | Mestanov | H04W 76/10 |
| 2020/0154322 A1* | 5/2020 | Liu | H04W 36/36 |
| 2021/0315042 A1 | 10/2021 | Ouzieli et al. | |
| 2021/0392494 A1* | 12/2021 | Huang | H04W 12/76 |
| 2022/0022033 A1* | 1/2022 | Ho | H04W 12/041 |
| 2022/0385656 A1* | 12/2022 | Gujarathi | H04L 63/0876 |
| 2022/0394603 A1* | 12/2022 | Majumdar | H04L 12/4633 |

FOREIGN PATENT DOCUMENTS

| | | | |
|---|---|---|---|
| EP | 3893549 A1 | 10/2021 | |
| EP | 4145947 A1 | 3/2023 | |
| WO | 2021197174 A1 | 10/2021 | |
| WO | 2021238823 A1 | 12/2021 | |

\* cited by examiner

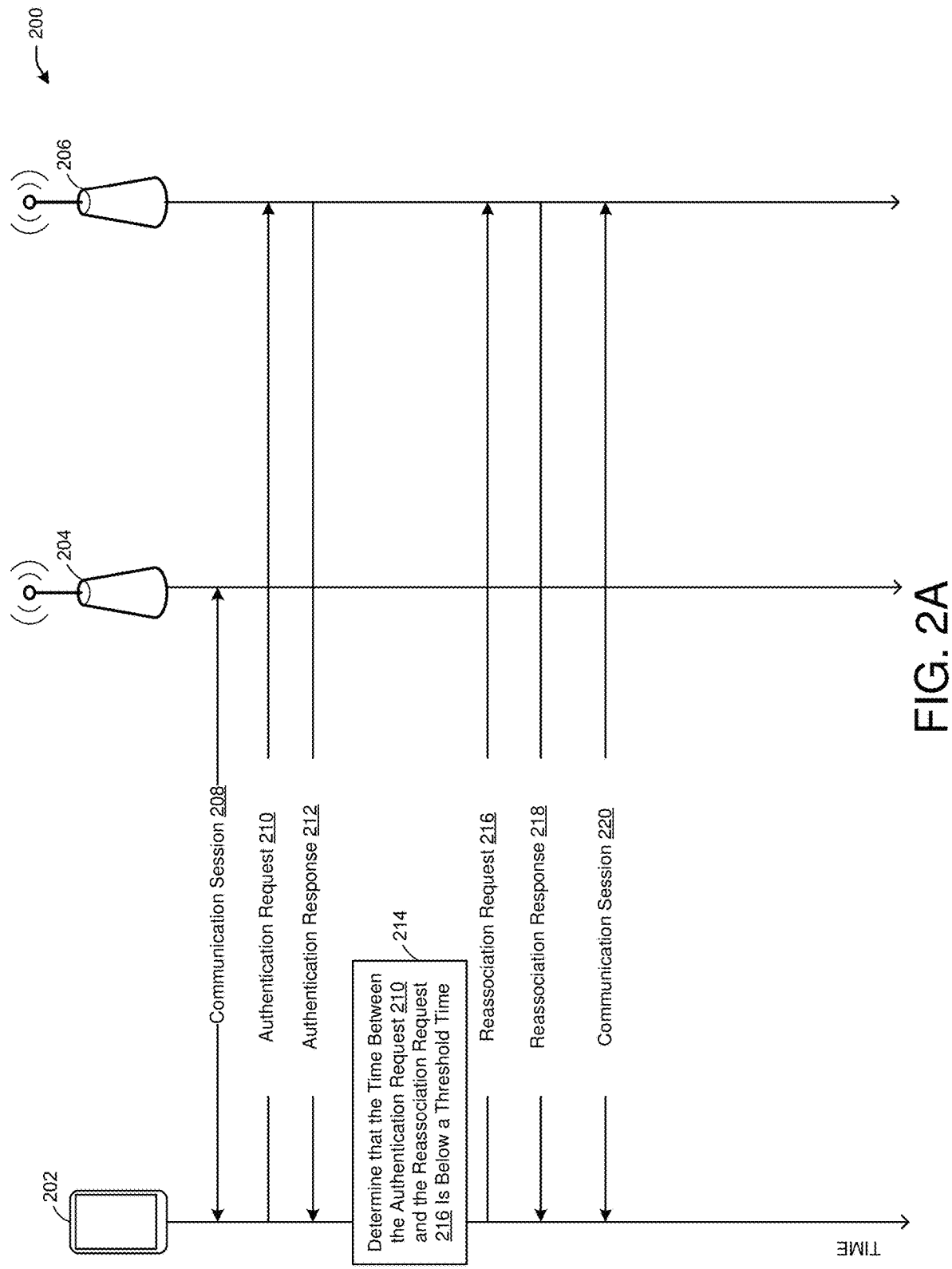

ENHANCED Wi-Fi FAST ROAMING TRANSITION FOR MOBILE DEVICES

TECHNICAL FIELD

This disclosure generally relates to systems and methods for wireless communications and, more particularly, to Wi-Fi roaming transitions for mobile devices.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 2A shows an over-the-air fast transition process for Wi-Fi roaming, in accordance with one or more example embodiments of the present disclosure.

DETAILED DESCRIPTION

Figure 1A:
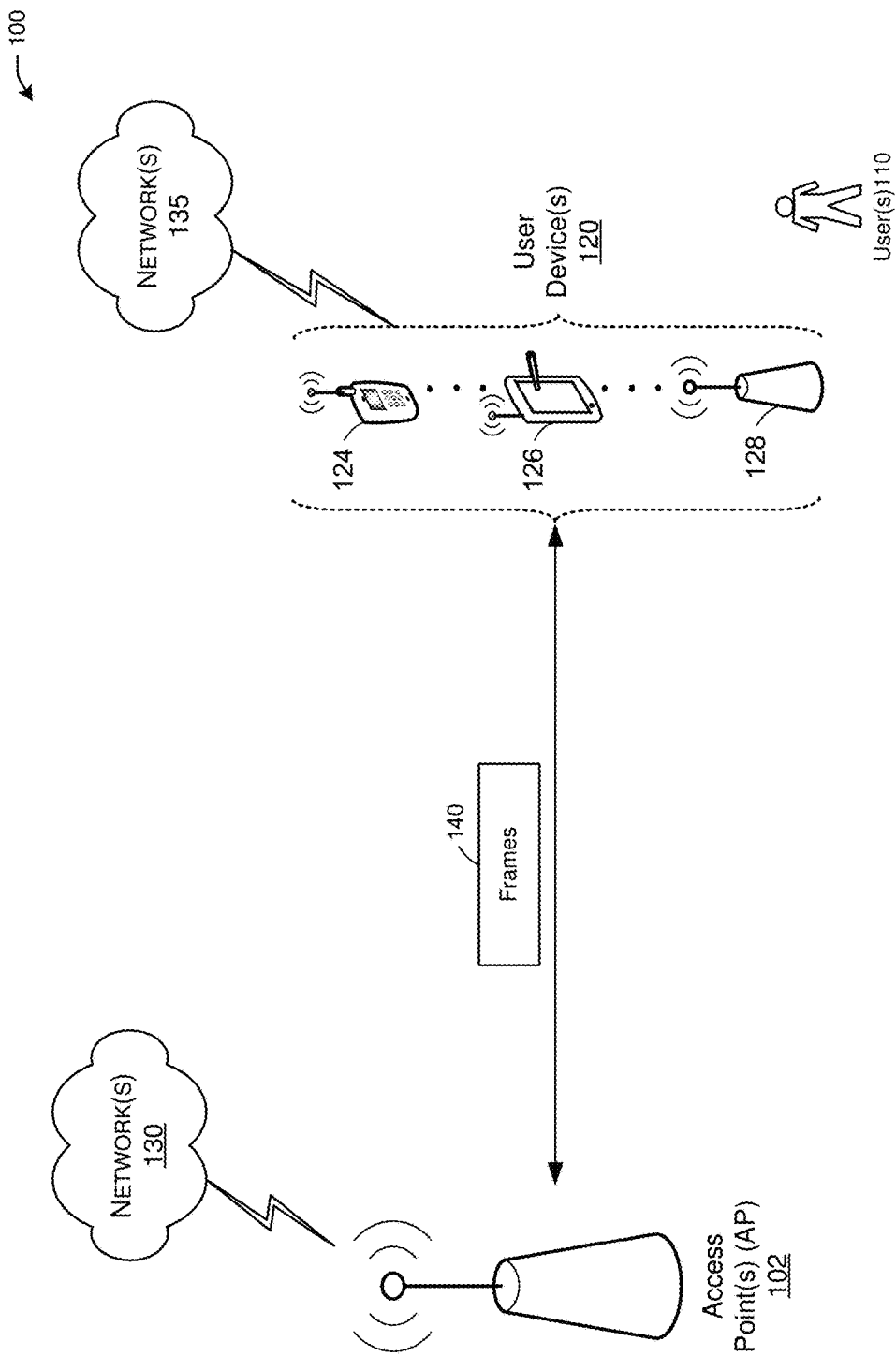
FIG. 1A is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Time-sensitive networking (TSN) refers to networking protocols and standards developed under IEEE 802.1 TSN to provide delivery of data with minimal latency and zero congestion loss using local area networks (LANs). TSN standards have been developed using Ethernet (e.g., wired) connections as the communication medium for time-sensitive applications, such as security and gaming. Recent efforts have included extending TSN operations over wireless communications, such as Wi-Fi as defined by the IEEE 802.11 family of standards. In addition, real-time applications (RTAs) operate within immediate timeframes, requiring low latency. Defining better support for TSN and RTAs is part of the next generation of Wi-Fi being developed for the 802.11be standard.

The 802.11r standard provides the procedures for FT for fast roaming, in which a device performs an initial handshake with the target AP prior to roaming to the target AP. A typical roaming procedure may include the following: 1) Periodic channel scanning. 2) Decision making regarding when and to which access point (AP) to switch. 3) A fast basic service set (BSS) transition (FT) procedure. 4) Packet forwarding from a source AP to a target AP, which may experience packet loss or delay due to rerouting. In a typical roaming procedure, there may be a disconnection time period between an station device (STA) and a distribution system (DS), which may result in significant delay or packet loss that is unacceptable for the reliability and latency requirements of TSN and RTAs. For example, the disconnection may occur at some time between the beginning of the roaming procedure and the time when the STA becomes associated with the target AP, and the routing table of the DS is updated accordingly.

In addition, there is currently no FT defined for multi-link devices (MLDs). A STA may refer to a logical entity that is a singly addressable instance of a medium access control (MAC) and physical layer (PHY) interface to the wireless medium (WM). A communication link (or just "link") in the context of an IEEE 802.11 medium access control (MAC) entity, may refer to a physical path consisting of exactly one traversal of the wireless medium (WM) that is usable to transfer MAC service data units (MSDUs) between two STAs.

In multi-link communications, a multi-link device (MLD), also referred to as a multi-link logical entity (MLLE), may refer to a device that has more than one affiliated STA and that has a medium access control (MAC) layer (e.g., of a communication layer stack) service access point (SAP) to a logical link control (LLC), which may include a MAC data service. An AP MLD (A MLD) may refer to an AP device, where each STA affiliated with the STA MLD is an AP STA. A non-AP MLD device (non-AP MLD) maybe an MLD, where each STA affiliated with the MLD is a non-AP STA. A MLD may be considered a logical/virtual entity with multiple STAs (e.g., AP STAs or non-AP STAs), and each STA concurrently may use separate communication links with corresponding STAs of another MLD. In this manner, a MLD may communicate over multiple communication links concurrently without having to drop one communication link to allow for establishing another communication link.

Multi-band operations provide important improvements of the 802.11be standard by defining a general framework that captures all the use cases (e.g., STA seamless and lossless transition between links/bands, STA operation on multiple links/bands with different traffic indicators on different links/bands, STA operation on multiple links/bands with aggregation for the same traffic indicator, etc.) for multi-band operations, whether the STA is a single radio device or a multi-radio device, and whether the APs have the same or different MAC addresses, are collocated or non-collocated.

Because there is currently no FT defined for MLDs, an MLD may use the existing FT protocol to roam from one A MLD to another A MLD. Although a multi-link association of an MLD may be performed using a single link, the MLD may have a multi-link connection with a current A MLD, and may disconnect from all of the links with the current A MLD once the FT protocol has completed with a single link of a target A MLD. As a result, MLDs face the same disconnection problem during roaming as single-link devices.

Some existing techniques to address the disconnection problem may leverage non-collocated MLDs/APs to support STA mobility. However, for non-collocated MLDs with a block acknowledgement (BA) agreement per an MLD, the reordering may need to be processed in another physical device, such as a multi-AP controller. In addition, single pairwise transient key sharing among multiple links in different locations may be vulnerable. For layer-3 (e.g., of the Open Systems Interconnection model communication stack) dual connectivity, the STA may be shown to the DS as two virtual STAs having different MAC addresses, and the integration of the multiple links may occur in a higher layer, which may be inefficient when compared with layer-2 multi-links in terms of traffic scheduling or steering.

There is therefore a need for a "soft handover" capability for STA mobility in Wi-Fi roaming.

In one or more embodiments, an enhanced soft handover capability in Wi-Fi roaming may leverage MLD capabilities. For example, enabling a MLD to retain downlink data reception from a source A MLD over one of the multiple communication links between the MLD and the A MLD while the MLD is associated a target A MLD may provide the soft handover capability. To follow a single AP association policy, the MLD may be associated with the target A MLD only while being shown to the DS.

In one or more embodiments, to enable the soft handover, while the MLD is setting up an association with a target A MLD over a communication link, the MLD may retain its connection with the source A MLD over any remaining links. The MLD may switch its remaining links from the source A MLD to the target A MLD once the routing table in the DS is updated and once there is no packet for the MLD from the source A MLD. During the time period, the MLD may be associated with the target A MLD over one link with one pairwise transient key (PTK) and one BA agreement while maintaining its association with the source A MLD over the remaining MLD links using the PTK and BA agreement with the source A MLD. However, this soft hander is not aligned with the single AP association policy as currently defined by the 802.11 standards, which define a single STA being associated with a single AP, and for MLD framework, uses a single PTK and single BA agreement and can be associated with a single A MLD at a time.

In one or more embodiments, one solution is to define two virtual MLDs, one with a source A MLD and one with a target A MLD. However, in this situation, a client device may be shown as two interfaces to the DS, and the integration of the two virtual MLDs may be performed in a higher communication stack layer. In addition, the client device may need to report the real channel conditions or other information to the DS to perform path selection for the traffic sent to the STA. This may be helpful when the client device needs to maintain a connection with both A MLDs to achieve an efficient traffic load balance or to achieve spatial diversity gain by being associated with two A MLDs in different geographic locations.

In one or more embodiments, to avoid packet loss or delay due to the roaming procedure, once an MLD completes association with a target A MLD over a first link, the MLD may follow a single A MLD association policy and be shown to the DS as a single MLD associated with the target A MLD by moving the management plane and new data plane connection with the DS through the target A MLD. However, the MLD may maintain its downlink reception from the source A MLD over multiple other links to complete packet reception, and the connections with the source A MLD may not be shown as active to the DS. As a result, to the DS, the MLD may appears as associated only with a single A MLD, so the DS may distribute the new coming data following a single AP association framework to the target A MLD after the FT procedure is complete. Once three is no data at the source A MLD for the MLD, the source A MLD may inform the MLD, and the MLD may switch its remaining links to the target A MLD. The MLD may need to signal the uplink connection to the source A MLD while maintaining the downlink connection to receive the remaining downlink transmissions from the source A MLD.

In one or more embodiments, in the downlink phase, for transmission control protocol (TCP) traffic, a source A MLD may not provide the response to a TCP talker to avoid confusion with the DS. The MLD may provide the reception status to the target A MLD, which may provide the feedback response to the TCP talker. When the MLD does not provide the reception status of the TCP traffic through a target A MLD, the TCP talker may retransmit the TCP packet through a target A MLD, and the MLD may provide a feedback response during that time.

In one or more embodiments, in the uplink phase, once an MLD completes the association with the target A MLD, the MLD may send the uplink data to the target A MLD. In this situation, when the MLD has sent a packet with a sequence number 0, 1, 2, and 3 to the source A MLD and has received a BA response indicating that only packets with sequence number 2 and 3, for example, are received successfully, the MLD may send the traffic stream, including the packet with sequence number 2 and 3, to the target A MLD using a new PTK and BA agreement.

In one or more embodiments, the association with a target MLD may be performed using a tunneling procedure through a source A MLD to further simplify the roaming procedure.

In one or more embodiments, the soft handover may apply to single-link (e.g., non-MLDs) and to MLDs. For example, a device, which may or may not be an MLD, connected to a current (e.g., source) AP, which may or may not be an A MLD, may authenticate to a target AP (e.g., using an authentication request-response exchange as defined by 802.11). When the devices are MLDs, the authentication with the target A MLD may occur over one link while the remaining links between the MLD and source A MLD may remain. Whether MLDs or not, a successful reassociation with the target AP may occur only when the time between the authentication request and the reassociation request does not exceed a reassociation deadline time (e.g., threshold time). Successful reassociation may include a reassociation request from the STA to the target AP, and a reassociation response from the target AP. When using MLDs, the other links may not be switched over to the target A MLD until all traffic from the source A MLD to the MLD has concluded or the MLD is disconnected from the source A MLD due to a bad channel condition. When communicating over a DS, the STA may send an FT request to the current AP prior to sending a reassociation request (e.g., the FT request instead of the authentication request sent to the target AP). An FT response from the source AP may allow the STA to perform reassociation with the target AP, but only when the time between the FT request and the reassociation request does not exceed the threshold time. The FT request and response may be used for MLDs as well, in which case the FT request and response may be sent using one MLD link, and the reassociation to the target A MLD may occur over that link while the MLD maintains other links with the source A MLD until all remaining traffic from the source A MLD to the MLD is complete over the other links.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment 100, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 11:
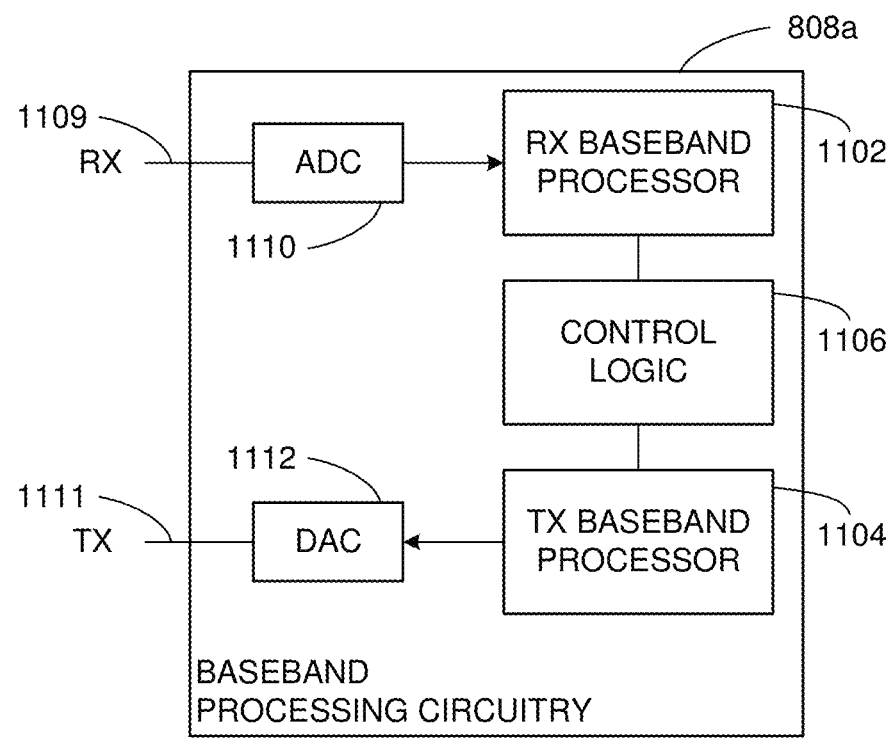
FIG. 11 illustrates an example baseband processing circuitry for use in the radio architecture of FIG. 8, in accordance with one or more example embodiments of the present disclosure.

In some embodiments, the user devices 120 and the AP 102 may include one or more computer systems similar to that of the functional diagram of FIG. 11 and/or the example machine/system of FIG. 12.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), 60 GHZ channels (e.g. 802.11ad, 802.11 ay, 802.11bf), and/or 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, one or more of the user devices 120 may exchange frames 140 with the APs 102. The frames 140 may include TSN frames, RTA frames, association/reassociation frames (e.g., requests and responses), authentication frames (e.g., requests and responses), FT requests and responses, and other traffic. For example, the APs 102 may include multiple APs, so the frames 140 may represent association/reassociation frames from a user device moving from one AP to another AP. The APs 102 and/or the user devices 120 may or may not be MLDs.

It is understood that the above descriptions are for purposes of illustration and are not meant to be limiting.

Figure 1B:
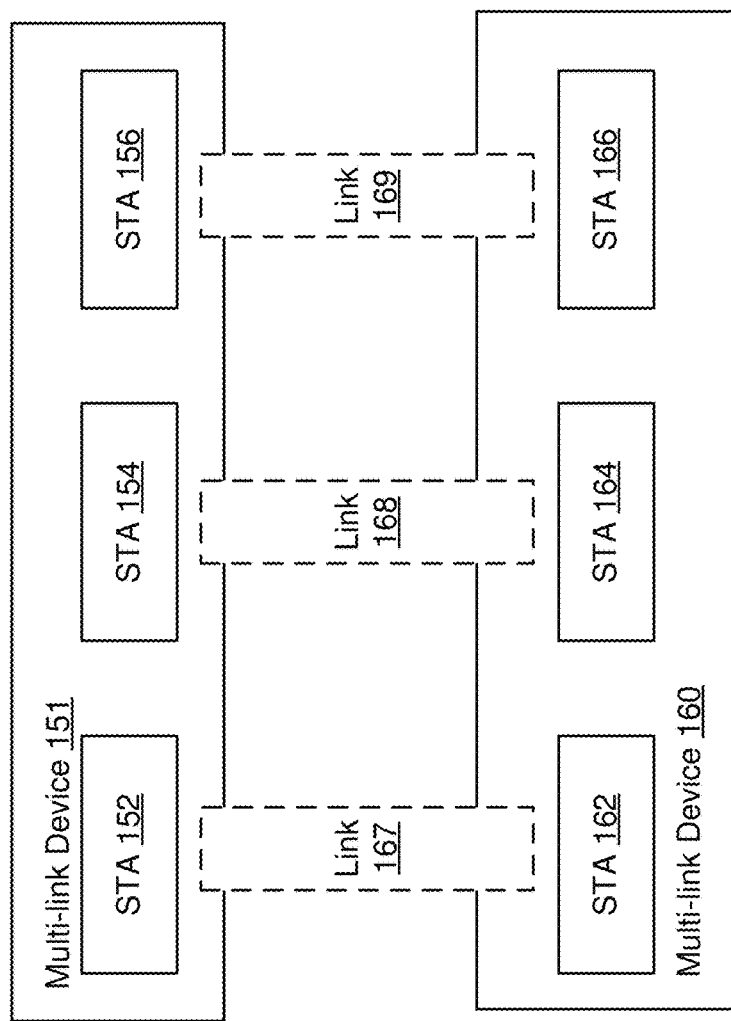
FIG. 1B depicts an illustrative schematic diagram for multi-link device (MLD) communications between two logical entities, in accordance with one or more example embodiments of the present disclosure.

FIG. 1B depicts an illustrative schematic diagram 150 for MLD communications between two logical entities, in accordance with one or more example embodiments of the present disclosure.

Referring to FIG. 1B, there are shown two MLDs in communication with each other. MLD 151 may include multiple STAs (e.g., STA 152, STA 154, STA 156, etc.), and MLD 160 may include multiple STAs (e.g., STA 162, STA 164, STA 166, etc.). The STAs of the MLD 151 and the STAs of the MLD 160 may set up links with each other (e.g., link 167 for a first frequency band used by the STA 152 and the STA 162, link 168 for a second frequency band used by the STA 154 and the STA 164, link 169 for a second frequency band used by the STA 156 and the STA 166). In this example of FIG. 1B, the two MLDs may be two separate physical devices, where each one comprises a number of virtual or logical devices (e.g., the STAs).

Figure 1C:
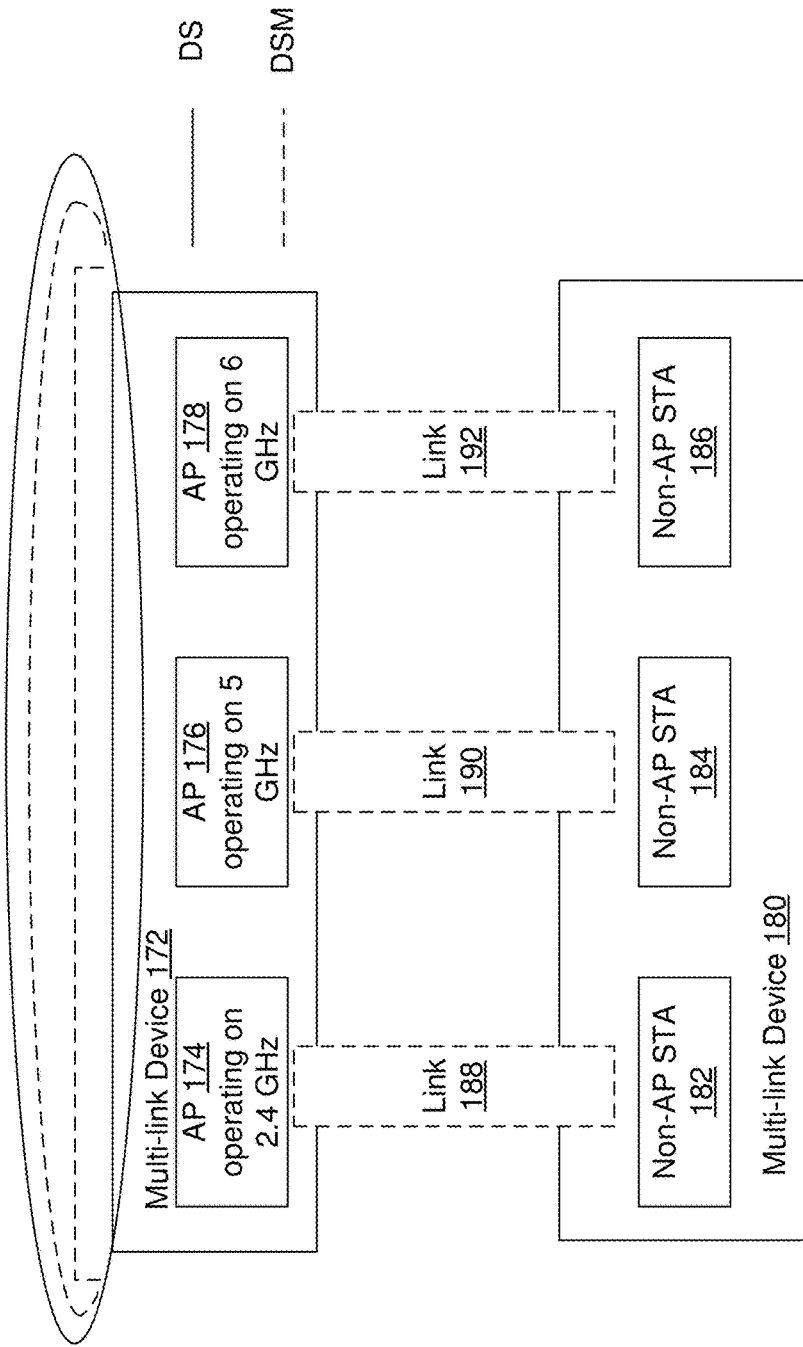
FIG. 1C depicts an illustrative schematic diagram for MLD communications between an access point (AP) MLD with logical entities and a non-AP MLD with logical entities, in accordance with one or more example embodiments of the present disclosure.

FIG. 1C depicts an illustrative schematic diagram 170 for MLD communications between an AP MLD with logical entities and a non-AP MLD with logical entities, in accordance with one or more example embodiments of the present disclosure.

Referring to FIG. 1C, there are shown two MLDs on either side, each which includes multiple STAs that can set up links with each other. For infrastructure framework, MLD 172 may be an A-MLD with logical APs (e.g., AP 174, AP 176, and AP 178) on one side, and MLD 180 may be a non-AP MLD including non-AP logical entities (non-AP STA 182, non-AP STA 184, and non-AP STA 186) on the other side. The detailed definition is shown below. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. It should be noted that this framework is a natural extension from the one link operation between two STAs, which are AP and non-AP STA under the infrastructure framework (e.g., when an AP is used as a medium for communication between STAs).

In the example of FIG. 1C, the MLD 172 and the MLD 180 may be two separate physical devices, where each one comprises a number of virtual or logical devices. For example, the multi-link AP logical entity may comprise three APs, AP 174 operating on 2.4 GHz (e.g., link 188), AP 176 operating on 5 GHz (e.g., link 190), and AP 178 operating on 6 GHz (e.g., link 192). Further, the multi-link non-AP logical entity may comprise three non-AP STAs, non-AP STA 182 communicating with AP 174 on link 188, non-AP STA 184 communicating with AP 176 on link 190, and non-AP STA 186 communicating with AP 178 on link 192.

The MLD 172 is shown in FIG. 1C to have access to a distribution system (DS), which is a system used to interconnect a set of BSSs to create an extended service set (ESS). The MLD 172 is also shown in FIG. 1C to have access a distribution system medium (DSM), which is the medium used by a DS for BSS interconnections. Simply put, DS and DSM allow the AP to communicate with different BSSs.

It should be understood that although the example shows three logical entities within the MLD 172 and the three logical entities within the MLD 180, this is merely for illustration purposes and that other numbers of logical entities with each of the MLDs may be envisioned.

FIG. 2A shows an over-the-air fast transition process 200 for Wi-Fi roaming, in accordance with one or more example embodiments of the present disclosure.

Referring to FIG. 2A, the over-the-air fast transition process 200 may include a STA 202, a source AP 204, and a target AP 206. The source AP 204 may be the AP with which the STA 202 has an existing communication session 208 when the STA 202 decides to transition to the target AP 206 (e.g., because the STA 202 is moving to another location). The STA 202 may send an authentication request 210 (e.g., an 802.11 authentication request) to the target AP 206, which may respond with an authentication response 212 (e.g., and 802.11 authentication response). At block 214, the STA 202 may generate a reassociation request 216 and determine that the time between the authentication request 210 and the reassociation request 216 is below a time threshold, allowing the STA 202 to perform reassociation to the target AP 206. For reassociation, the STA 202 may send the reassociation request 216 (e.g., an 802.11 reassociation request) to the target AP 206, which may respond with a reassociation response 218 (e.g., an 802.11 reassociation response), allowing for the STA 202 to establish a communication session 220 with the target AP 206.

Figure 2B:
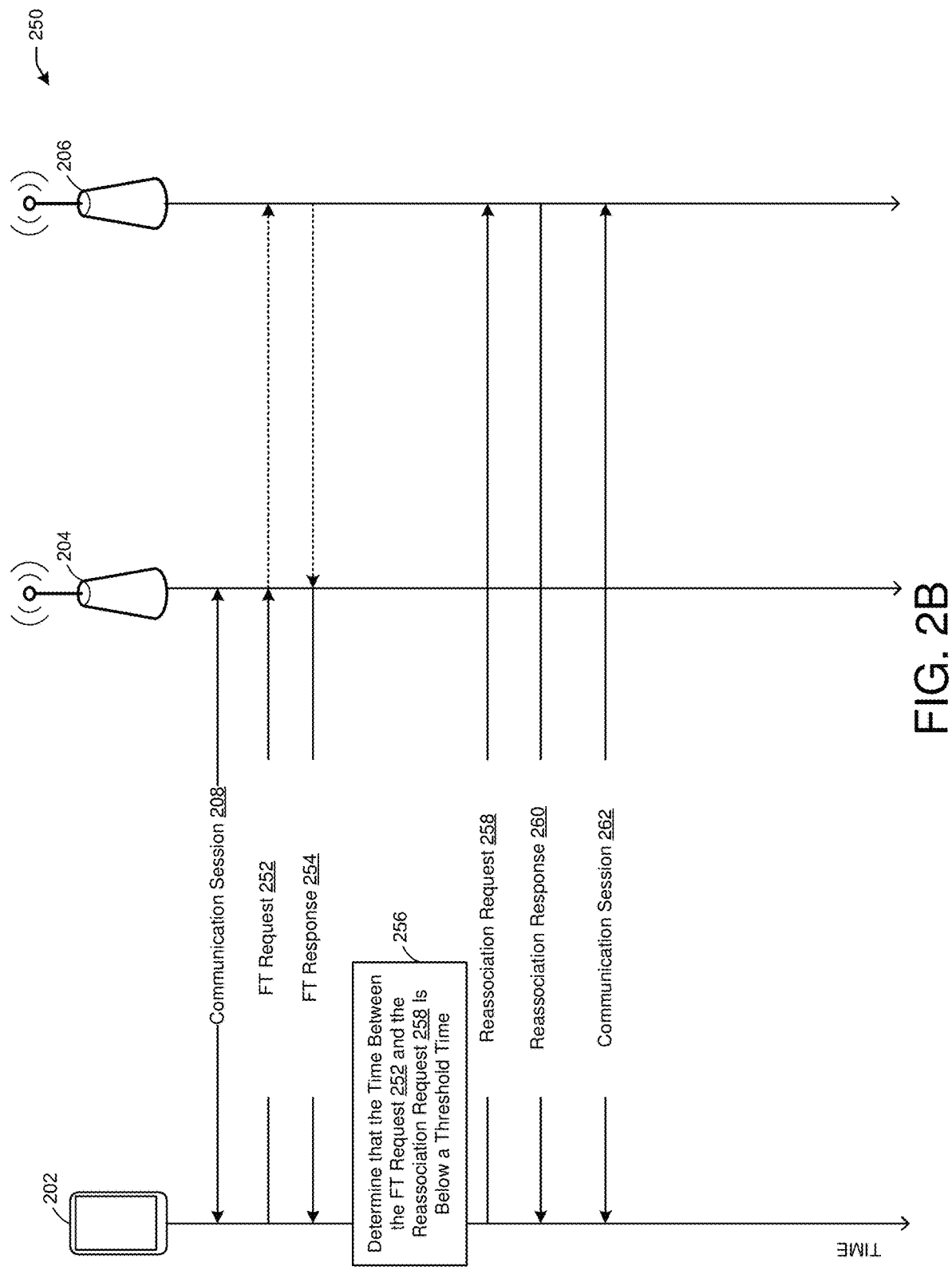
FIG. 2B shows an over-the-distribution system fast transition process for Wi-Fi roaming, in accordance with one or more example embodiments of the present disclosure.

FIG. 2B shows an over-the-(DS) fast transition process 250 for Wi-Fi roaming, in accordance with one or more example embodiments of the present disclosure.

Referring to FIG. 2B, the over-the-DS fast transition process 250 may include the STA 202, the source AP 204, and the target AP 206 of FIG. 2A. During the communication session 208 with the source AP 204, the STA 202 may need to associate with the target AP 206, and may send an FT request 252 (e.g., an 802.11 authentication request carried in an FT action frame) to the source AP 204 to identify the target AP 206 to which the STA 202 is attempting to connect. The source AP 204 may forward the FT request 252 to the target AP 206, which may respond with an FT response 254 (e.g., to the source AP 204, which may forward the FT response 254 to the STA 202). The FT response 254 may be an FT action frame including an 802.11 authentication response (e.g., confirming the authentication to the target AP 206). At block 256, the STA 202 may generate a reassociation request 258 and determine that the time between the FT request 252 and the reassociation request 258 is below a time threshold, allowing the STA 202 to perform reassociation to the target AP 206. For reassociation, the STA 202 may send the reassociation request 258 (e.g., an 802.11 reassociation request) to the target AP 206, which may respond with a reassociation response 260 (e.g., an 802.11 reassociation response), allowing for the STA 202 to establish a communication session 262 with the target AP 206. In this manner, the over-the-DS fast transition process 250 may only allow the STA 202 to perform the reassociation request-response exchange with the target AP 206 (e.g., because the FT request-response exchange is through the source AP 204) to complete the roaming process.

Figure 3A:
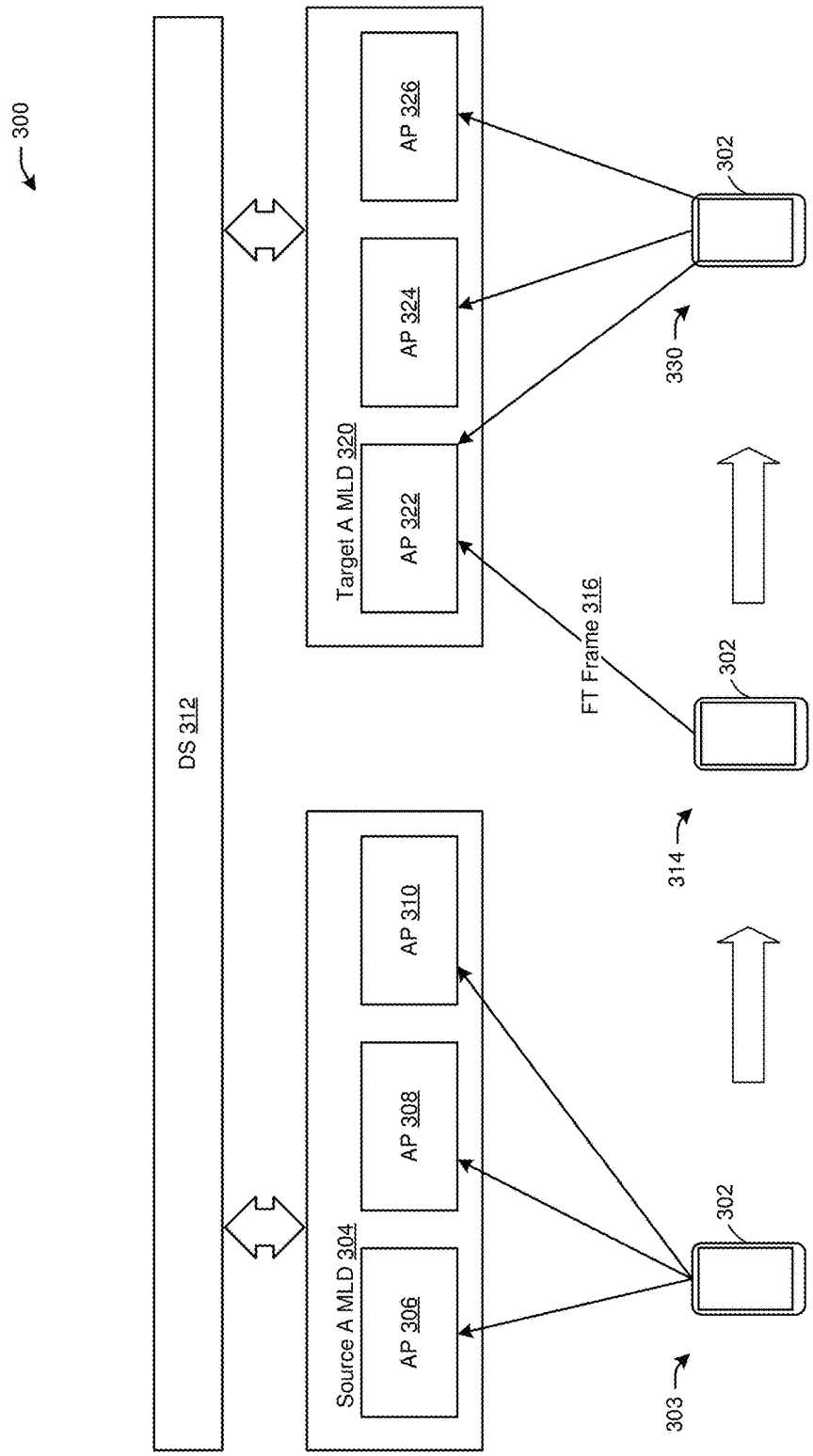
FIG. 3A shows a process for fast transition for MLDs, in accordance with one or more aspects of the present disclosure.

FIG. 3A shows a process 300 for fast transition for MLDs, in accordance with one or more aspects of the present disclosure.

Referring to FIG. 3A, the process 300 may include a MLD 302 having multiple connections (e.g., each over respective links as indicated by the arrows shown in FIG. 3A), when at location 303, with a source A MLD 304 (e.g., having an AP 306, an AP 308, and an AP 310). The source A MLD 304 may be in communication with a DS 312 (e.g., which may maintain routing tables). As the MLD 302 moves to location 314, the MLD 302 may need to connect to a target A MLD 320, so the MLD 302 may send an FT frame 316 (e.g., FT request) to the target A MLD 320 (e.g., to an AP 322 of the A MLD, which also may have AP 324 and AP 326). In this example, the MLD 302 disconnects from its links with the source A MLD 304 when at location 314 prior to establishing a connection over all links with the target A MLD 320. Once the MLD 302 moves to location 330, the MLD 302 may establish connections over multiple links with the AP 322, the AP 324, and the AP 326 of the target A MLD 320.

Figure 3B:
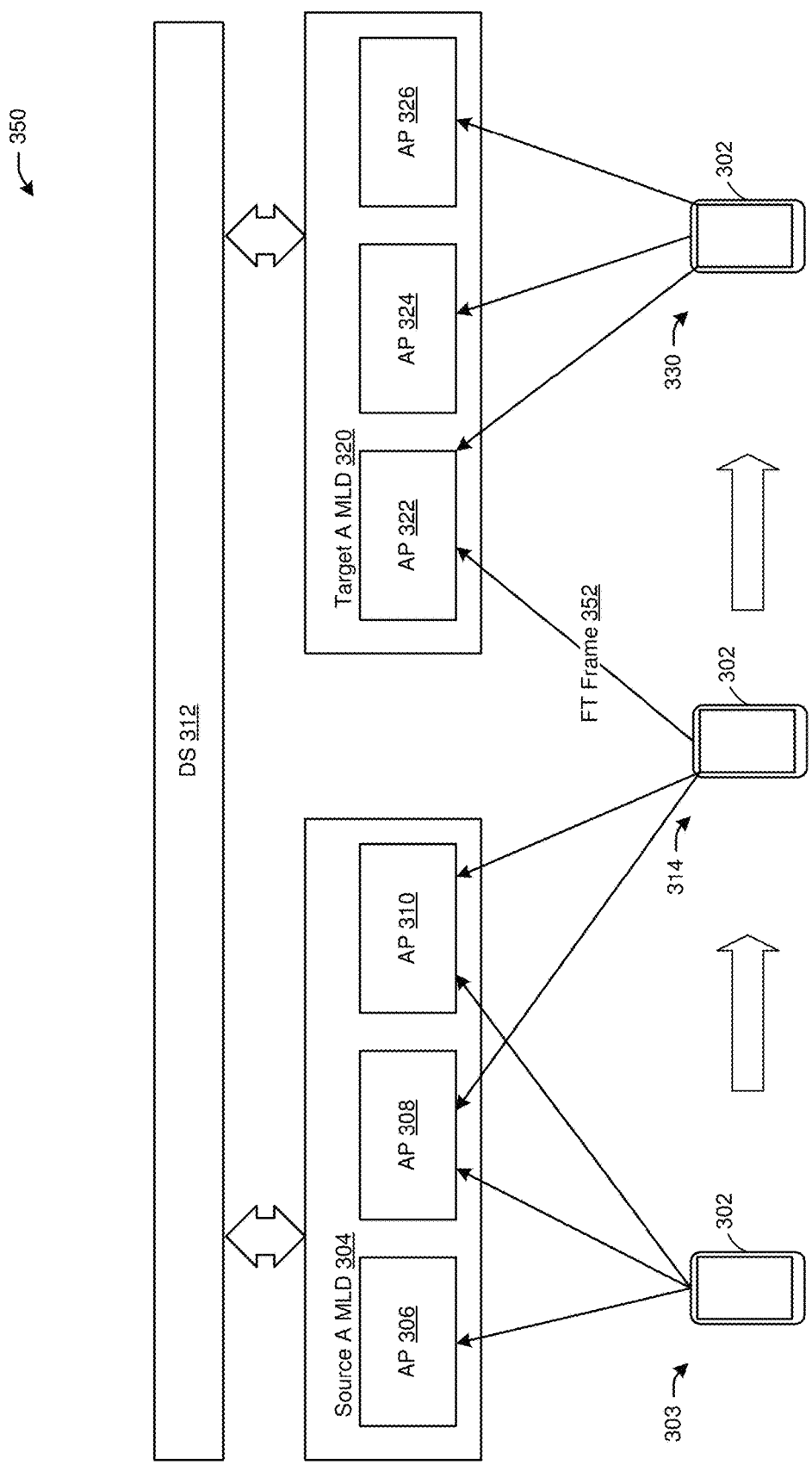
FIG. 3B shows a process for fast transition for MLDs, in accordance with one or more aspects of the present disclosure.

FIG. 3B shows a process 350 for fast transition for MLDs, in accordance with one or more aspects of the present disclosure.

Referring to FIG. 3B, the process 350 may include the MLD 302 having multiple connections (e.g., each over respective links as indicated by the arrows shown in FIG. 3B), when at the location 303, with the source A MLD 304. The source A MLD 304 may be in communication with the DS 312 (e.g., which may maintain routing tables). As the MLD 302 moves to the location 314, the MLD 302 may need to connect to a target A MLD 320, so the MLD 302 may send an FT frame 352 (e.g., FT request) to the target A MLD 320. However, in contrast with FIG. 3A, when the MLD 302 sends the FT frame 352, the MLD 302 may use a single link while maintaining its other links with the AP 308 and the AP 310 of the source A MLD 304, for example. When the MLD 302 moves to the location 330 and has confirmed with the source A MLD 304 that there is no more traffic to exchange over the AP 308 and the AP 310, the MLD 302 may complete its roaming transition to the target A MLD 320 for all remaining links. Therefore, during this period, the MLD 302 may be associated with the target A MLD 320 over one link (e.g., via the AP 322) with one PTK and one BA agreement, while retaining "association" with the source A MLD 304 over the remaining links of the MLD 302 (e.g., using the AP 308 and the AP 310) with the original PTK and BA agreement with the source A MLD 304.

Figure 4A:
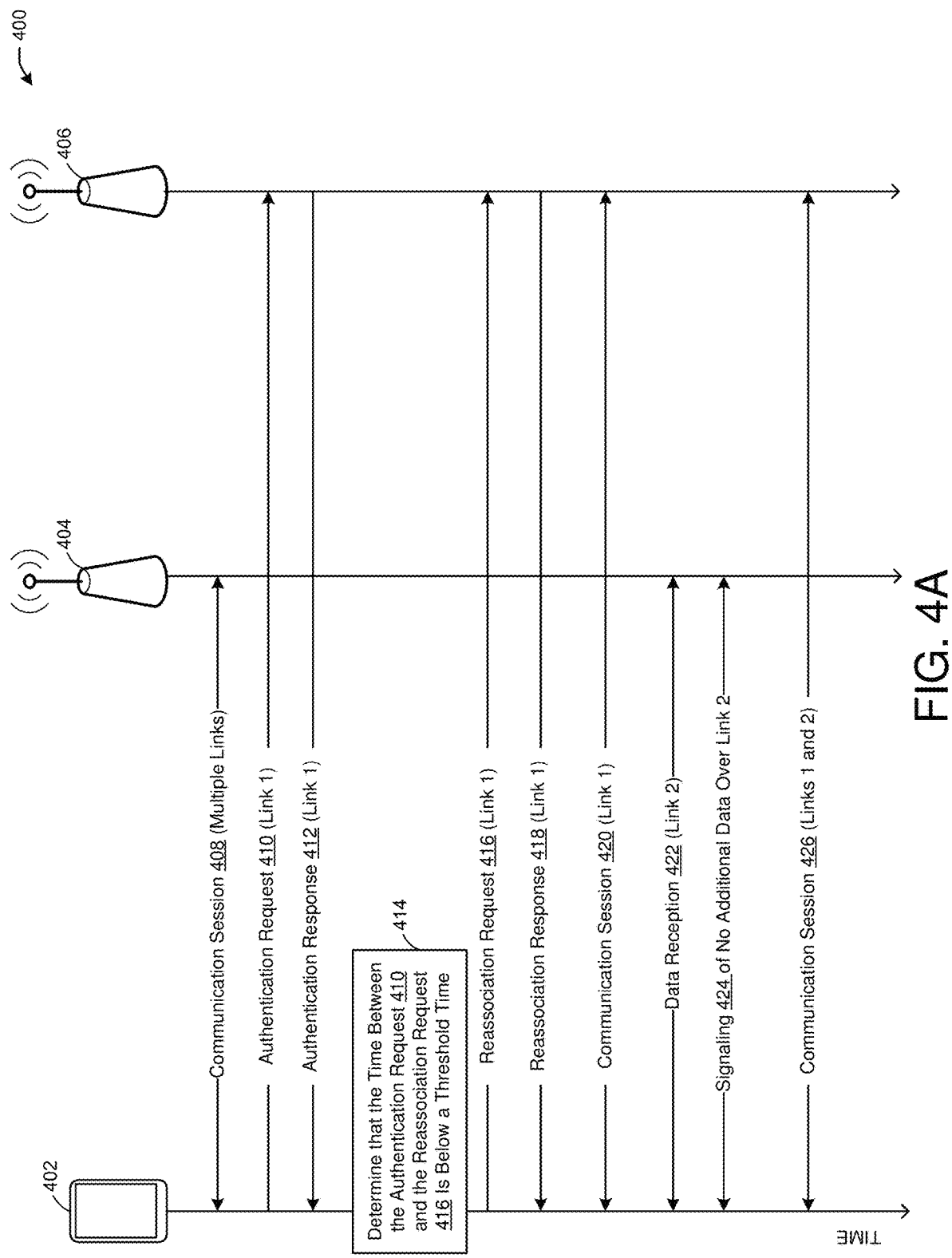
FIG. 4A shows an over-the-air fast transition process for Wi-Fi roaming using MLDs, in accordance with one or more example embodiments of the present disclosure.

FIG. 4A shows an over-the-air fast transition process 400 for Wi-Fi roaming using MLDs, in accordance with one or more example embodiments of the present disclosure.

Referring to FIG. 4A, the over-the-air fast transition process 400 may include a MLD 402, a source A MLD 404, and a target A MLD 406. The source A MLD 404 may be the A MLD with which the MLD 402 has an existing communication session 408 (e.g., over multiple links) when the MLD 402 decides to transition to the target A MLD 406 (e.g., because the MLD 402 is moving to another location). The MLD 402 may send an authentication request 410 (e.g., an 802.11 authentication request) to the target A MLD 406 using a first link of multiple links, and the target A MLD 406 may respond with an authentication response 412 (e.g., and 802.11 authentication response) sent over the first link. At block 414, the MLD 402 may generate a reassociation request 416 and determine that the time between the authentication request 410 and the reassociation request 416 is below a time threshold, allowing the MLD 402 to perform reassociation to the target A MLD 406. For reassociation, the MLD 402 may send the reassociation request 416 (e.g., an 802.11 reassociation request) to the target A MLD 406 over the first link, and the A MLD 406 may respond with a reassociation response 418 (e.g., an 802.11 reassociation response) sent over the first link, allowing for the MLD 402 to establish a communication session 420 with the target A MLD 406 over the first link.

Still referring to FIG. 4A, because of the multiple links used by the MLD 402, the MLD 402 may maintain its connection using its other links with the source A MLD 404 (e.g., even though link 1 may be switched to the target A MLD 406, link 2 and/or any other links between the MLD 402 and the source A MLD 404 may be maintained at least temporarily for a time period after link 1 is switched to connect the MLD 402 to the target A MLD 406). The one or more remaining links between the MLD 402 and the source A MLD 404 may be maintained until data reception 422 is complete using the one or more remaining links. When all data transmissions between the MLD 402 and the source A MLD 404 are complete after switching the first link of the MLD 402 to the target A MLD 406, the MLD 402 and the source A MLD 404 may perform signaling 424 to communicate that no additional data is available to transmit over the one or more additional links remaining between the MLD 402 and the source A MLD 404. Once the signaling 424 confirms the completion of transmissions between the MLD 402 and the source A MLD 404, the MLD 402 may establish one or more communication sessions 426 with target A MLD 406 by switching the one or more additional links from the source A MLD 404 to the target A MLD 406.

Figure 4B:
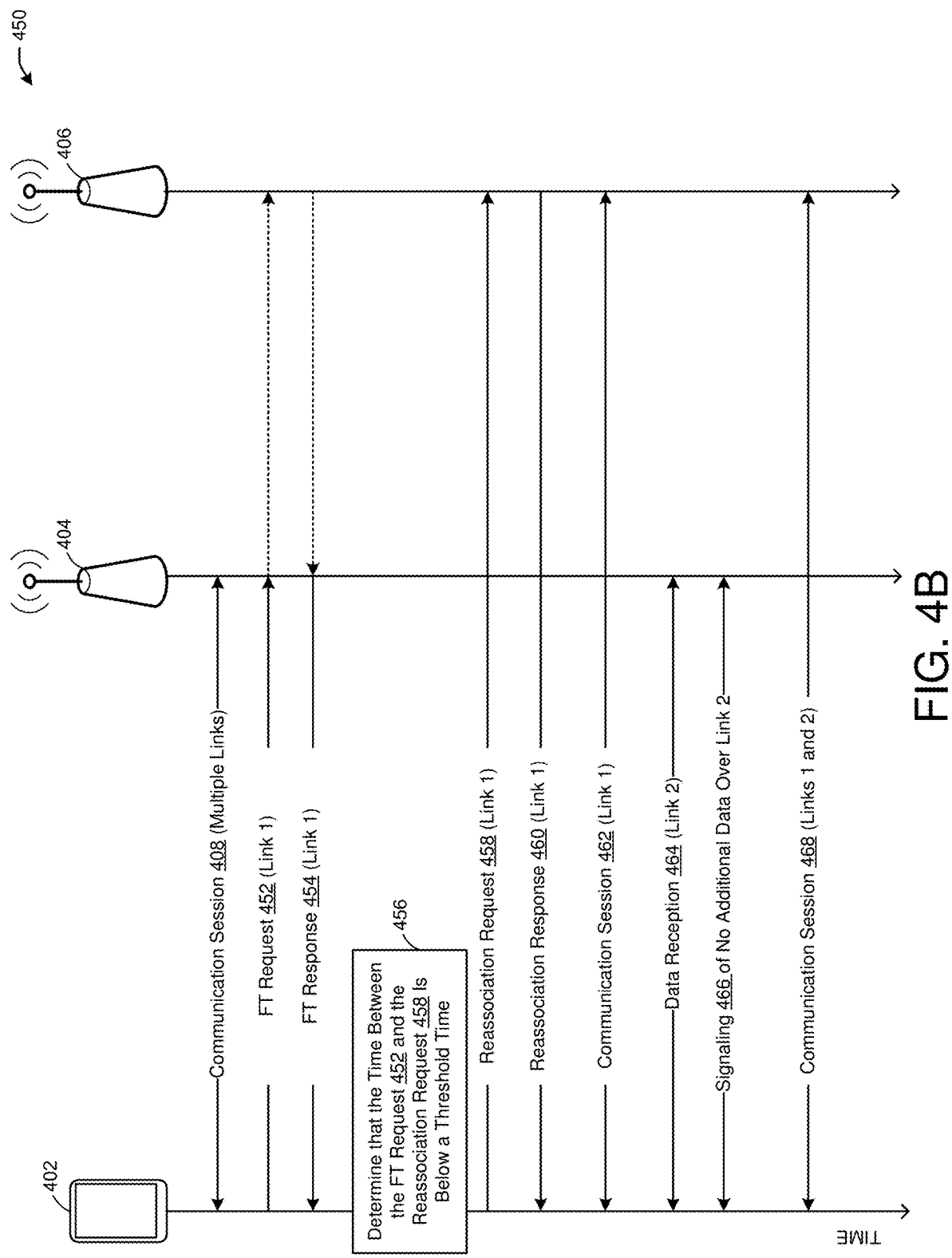
FIG. 4B shows an over-the-distribution system fast transition process for Wi-Fi roaming using MLDs, in accordance with one or more example embodiments of the present disclosure.

FIG. 4B shows an over-the-DS fast transition process 450 for Wi-Fi roaming using MLDs, in accordance with one or more example embodiments of the present disclosure.

Referring to FIG. 4B, the over-the-DS fast transition process 450 may include the MLD 402, the source A MLD 404, and the target A MLD 406. The source A MLD 404 may be the A MLD with which the MLD 402 has the existing communication session 408 (e.g., over multiple links) when the MLD 402 decides to transition to the target A MLD 406 (e.g., because the MLD 402 is moving to another location). The MLD 402 may send an FT request 452 (e.g., an 802.11 authentication request carried in an FT action frame) to the source A MLD 404 using a first link of multiple links, and the source A MLD 404 may forward the FT request 452 to the target A MLD 406. The target A MLD 406 may respond with an FT response 454 (e.g., and 802.11 authentication response) sent to the source A MLD 404, which may forward the FT response 454 to the MLD 402 over the first link. The FT response 454 may be an FT action frame carrying an 802.11 authentication response (e.g., confirming the authentication to the target A MLD 406). At block 456, the MLD 402 may generate a reassociation request 458 and determine that the time between the FT request 452 and the reassociation request 458 is below a time threshold, allowing the MLD 402 to perform reassociation to the target A MLD 406. For reassociation, the MLD 402 may send the reassociation request 458 (e.g., an 802.11 reassociation request) to the target A MLD 406 over the first link, and the A MLD 406 may respond with a reassociation response 460 (e.g., an 802.11 reassociation response) sent over the first link, allowing for the MLD 402 to establish a communication session 462 with the target A MLD 406 over the first link.

Still referring to FIG. 4B, because of the multiple links used by the MLD 402, the MLD 402 may maintain its connection using its other links with the source A MLD 404 (e.g., even though link 1 may be switched to the target A MLD 406, link 2 and/or any other links between the MLD 402 and the source A MLD 404 may be maintained at least temporarily for a time period after link 1 is switched to connect the MLD 402 to the target A MLD 406). The one or more remaining links between the MLD 402 and the source A MLD 404 may be maintained until data reception 464 is complete using the one or more remaining links. When all data transmissions between the MLD 402 and the source A MLD 404 are complete after switching the first link of the MLD 402 to the target A MLD 406, the MLD 402 and the source A MLD 404 may perform signaling 466 to communicate that no additional data is available to transmit over the one or more additional links remaining between the MLD 402 and the source A MLD 404. Once the signaling 466 confirms the completion of transmissions between the MLD 402 and the source A MLD 404, the MLD 402 may establish one or more communication sessions 468 with target A MLD 406 by switching the one or more additional links from the source A MLD 404 to the target A MLD 406.

Figure 5:
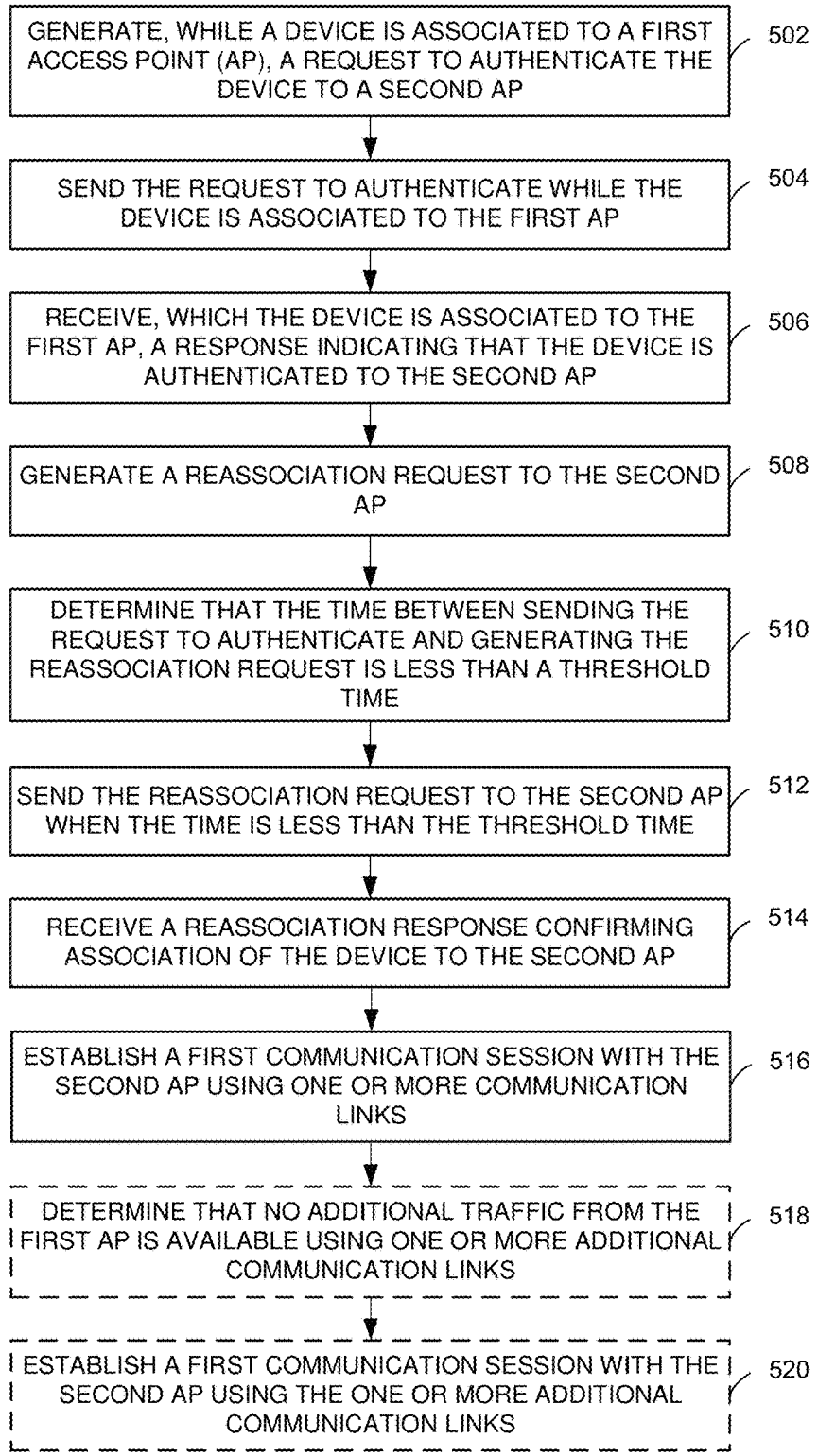
FIG. 5 illustrates a flow diagram of illustrative process for fast transition Wi-Fi roaming, in accordance with one or more example embodiments of the present disclosure.

FIG. 5 illustrates a flow diagram of illustrative process 500 for fast transition Wi-Fi roaming, in accordance with one or more example embodiments of the present disclosure.

At block 502, a device (e.g., one of the user devices 120 of FIG. 1A, the STA 202 of FIGS. 2A and 2B, the MLD 402 of FIGS. 4A and 4B) may be a roaming device that is associated to a first AP (e.g., the source AP 204 of FIGS. 2A and 2B, the source A MLD 402 of FIGS. 4A and 4B) using one or multiple communication links (e.g., when the device is an MLD). At some time while associated to the first AP, the device may roam and request to switch connections to a second AP. To perform the switch, the device may use an over-the-air or over-the-DS protocol. The device may generate a request to authenticate to the second AP. The request may be an 802.11 authentication request or an 802.11 FT action frame including an authentication request.

At block 504, the device may send the request to authenticate. When using the over-the-air protocol, the device may send the request directly to the second AP (e.g., rather than to the first AP). When using the over-the-DS protocol, the device may send the request to the first AP to forward to the second AP. When the device is an MLD, the device may send the request using one communication link while maintaining one or more additional communication links with the first AP.

At block 506, the device may receive a response indicating that the device is authenticated to the second AP. The response may be received while the device is still associated to the first AP (e.g., at least on one other communication link). The response may be received directly from the second AP when using the over-the-air protocol (e.g., using an 802.11 authentication response), and may be received from the first AP when using the over-the-DS protocol (e.g., an FT action frame including an authentication response from the second AP).

At block 508, the device may generate reassociation request to reassociate to the second AP. A successful reassociation from the first AP to the second AP may occur only when the time between sending the request to authenticate and the reassociation request is below a threshold time. At block 510, the device may determine that the time is less than the threshold time (otherwise, block 512 may not occur). At block 512, the device may send the reassociation request to the second AP. At block 514, the device may receive a reassociation response from the second AP confirming the reassociation, and allowing the device at block 516 to establish a communication session with the second AP.

When the device is an MLD, the device may maintain one or more additional communication links with the first AP (e.g., A MLD) until there is no additional traffic to transmit using the one or more additional communication links. Therefore, optionally, the device may determine at block 518 that no additional traffic is available between the device and the first AP using the one or more additional communication links. At block 520, optionally, once there is no additional traffic available between the device and the first AP using the one or more additional communication links, the device may switch the one or more additional communication links from the first AP to the second AP to establish one or more additional communication sessions.

It is understood that the above descriptions are for purposes of illustration and are not meant to be limiting.

Figure 6:
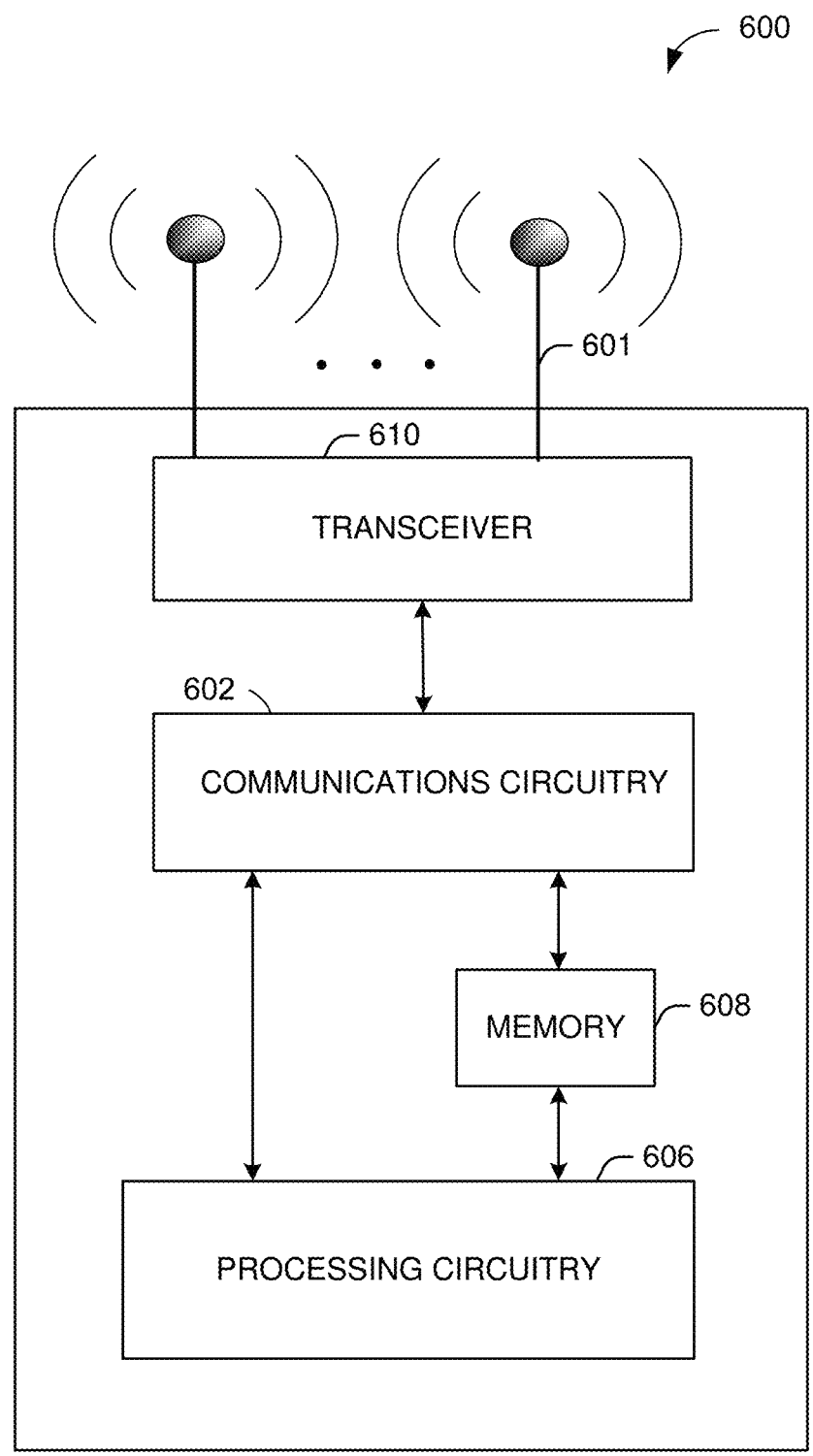
FIG. 6 illustrates a functional diagram of an exemplary communication station that may be suitable for use as a user device, in accordance with one or more example embodiments of the present disclosure.

FIG. 6 shows a functional diagram of an exemplary communication station 600, in accordance with one or more example embodiments of the present disclosure. In one embodiment, FIG. 6 illustrates a functional block diagram of a communication station that may be suitable for use as an AP 102 (FIG. 1A) or a user device 120 (FIG. 1A) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 1102 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device.

Figure 7:
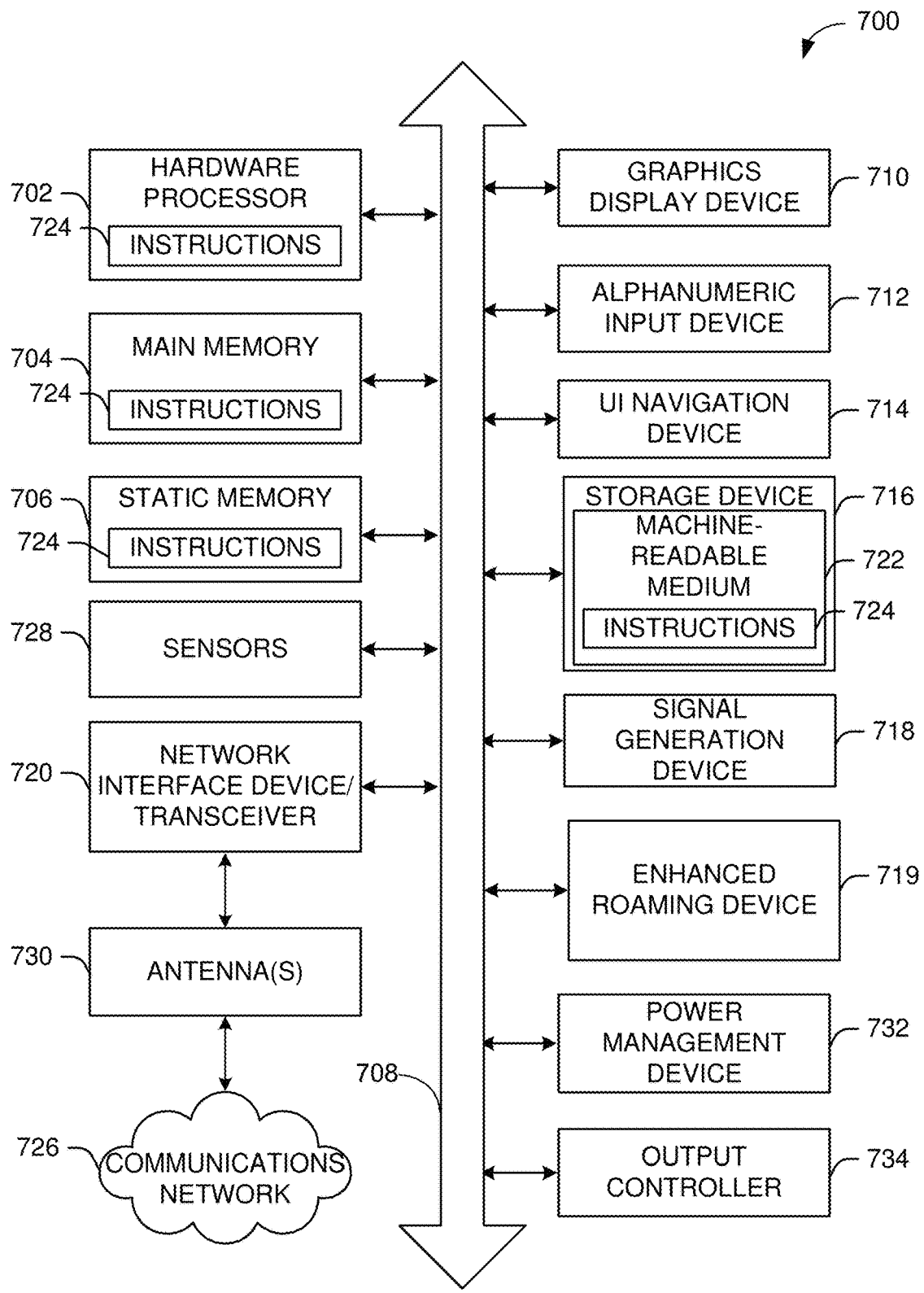
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 or system upon which any one or more of the techniques (e.g., methodologies) discussed herein may be performed.

In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), an enhanced roaming device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 702 for generation and processing of the baseband signals and for controlling operations of the main memory 704, the storage device 716, and/or the enhanced roaming device 719. The baseband processor may be provided on a single radio card, a single chip, or an integrated circuit (IC).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The enhanced roaming device 719 may carry out or perform any of the operations and processes (e.g., process 500) described and shown above.

It is understood that the above are only a subset of what the enhanced roaming device 719 may be configured to perform and that other functions included throughout this disclosure may also be performed by the enhanced roaming device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 8:
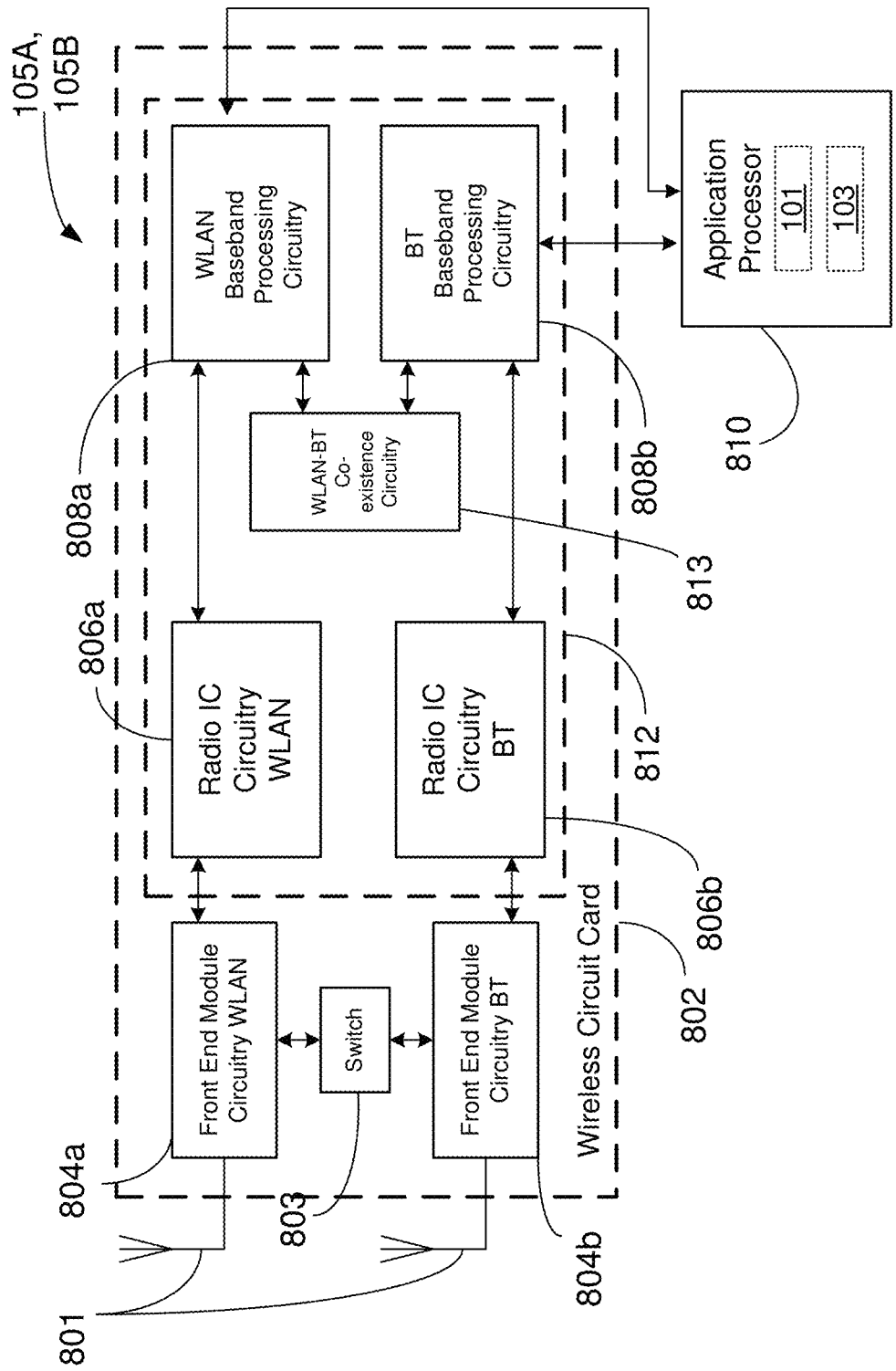
FIG. 8 is a block diagram of a radio architecture in accordance with some examples.

FIG. 8 is a block diagram of a radio architecture 105A, 105B in accordance with some embodiments that may be implemented in any one of the example APs 102 and/or the example user devices 120 of FIG. 1A. Radio architecture 105A, 105B may include radio front-end module (FEM) circuitry 804a-b, radio IC circuitry 806a-b and baseband processing circuitry 808a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 804a-b may include a WLAN or Wi-Fi FEM circuitry 804a and a Bluetooth (BT) FEM circuitry 804b. The WLAN FEM circuitry 804a may include a receive signal path comprising circuitry configured to operate on WLAN RF signals received from one or more antennas 801, to amplify the received signals and to provide the amplified versions of the received signals to the WLAN radio IC circuitry 806a for further processing. The BT FEM circuitry 804b may include a receive signal path which may include circuitry configured to operate on BT RF signals received from one or more antennas 801, to amplify the received signals and to provide the amplified versions of the received signals to the BT radio IC circuitry 806b for further processing. FEM circuitry 804a may also include a transmit signal path which may include circuitry configured to amplify WLAN signals provided by the radio IC circuitry 806a for wireless transmission by one or more of the antennas 801. In addition, FEM circuitry 804b may also include a transmit signal path which may include circuitry configured to amplify BT signals provided by the radio IC circuitry 806b for wireless transmission by the one or more antennas. In the embodiment of FIG. 8, although FEM 804a and FEM 804b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 806a-b as shown may include WLAN radio IC circuitry 806a and BT radio IC circuitry 806b. The WLAN radio IC circuitry 806a may include a receive signal path which may include circuitry to down-convert WLAN RF signals received from the FEM circuitry 804a and provide baseband signals to WLAN baseband processing circuitry 808a. BT radio IC circuitry 806b may in turn include a receive signal path which may include circuitry to down-convert BT RF signals received from the FEM circuitry 804b and provide baseband signals to BT baseband processing circuitry 808b. WLAN radio IC circuitry 806a may also include a transmit signal path which may include circuitry to up-convert WLAN baseband signals provided by the WLAN baseband processing circuitry 808a and provide WLAN RF output signals to the FEM circuitry 804a for subsequent wireless transmission by the one or more antennas 801. BT radio IC circuitry 806b may also include a transmit signal path which may include circuitry to up-convert BT baseband signals provided by the BT baseband processing circuitry 808b and provide BT RF output signals to the FEM circuitry 804b for subsequent wireless transmission by the one or more antennas 801. In the embodiment of FIG. 8, although radio IC circuitries 806a and 806b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 808a-b may include a WLAN baseband processing circuitry 808a and a BT baseband processing circuitry 808b. The WLAN baseband processing circuitry 808a may include a memory, such as, for example, a set of RAM arrays in a Fast Fourier Transform or Inverse Fast Fourier Transform block (not shown) of the WLAN baseband processing circuitry 808a. Each of the WLAN baseband circuitry 808a and the BT baseband circuitry 808b may further include one or more processors and control logic to process the signals received from the corresponding WLAN or BT receive signal path of the radio IC circuitry 806a-b, and to also generate corresponding WLAN or BT baseband signals for the transmit signal path of the radio IC circuitry 806a-b. Each of the baseband processing circuitries 808a and 808b may further include physical layer (PHY) and medium access control layer (MAC) circuitry, and may further interface with a device for generation and processing of the baseband signals and for controlling operations of the radio IC circuitry 806a-b.

Referring still to FIG. 8, according to the shown embodiment, WLAN-BT coexistence circuitry 813 may include logic providing an interface between the WLAN baseband circuitry 808a and the BT baseband circuitry 808b to enable use cases requiring WLAN and BT coexistence. In addition, a switch 803 may be provided between the WLAN FEM circuitry 804a and the BT FEM circuitry 804b to allow switching between the WLAN and BT radios according to application needs. In addition, although the antennas 801 are depicted as being respectively connected to the WLAN FEM circuitry 804a and the BT FEM circuitry 804b, embodiments include within their scope the sharing of one or more antennas as between the WLAN and BT FEMs, or the provision of more than one antenna connected to each of FEM 804a or 804b.

In some embodiments, the front-end module circuitry 804a-b, the radio IC circuitry 806a-b, and baseband processing circuitry 808a-b may be provided on a single radio card, such as wireless radio card 802. In some other embodiments, the one or more antennas 801, the FEM circuitry 804a-b and the radio IC circuitry 806a-b may be provided on a single radio card. In some other embodiments, the radio IC circuitry 806a-b and the baseband processing circuitry 808a-b may be provided on a single chip or integrated circuit (IC), such as IC 812.

In some embodiments, the wireless radio card 802 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 8, the BT baseband circuitry 808b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 9:
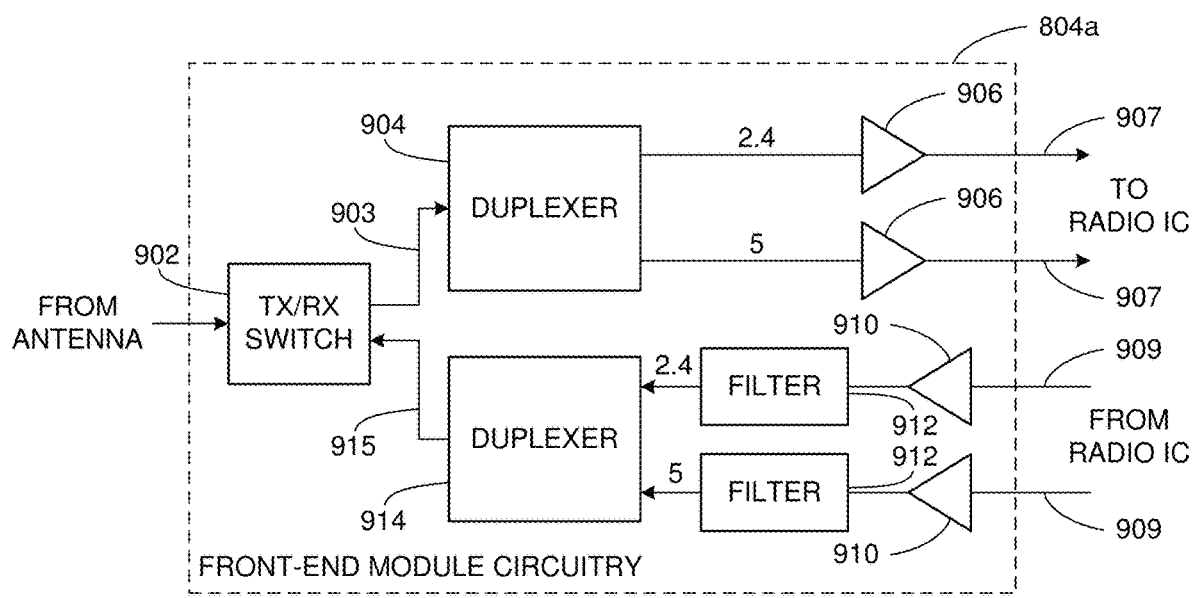
FIG. 9 illustrates an example front-end module circuitry for use in the radio architecture of FIG. 8, in accordance with one or more example embodiments of the present disclosure.

FIG. 9 illustrates WLAN FEM circuitry 904a in accordance with some embodiments. Although the example of FIG. 9 is described in conjunction with the WLAN FEM circuitry 804a, the example of FIG. 9 may be described in conjunction with the example BT FEM circuitry 804b (FIG. 13), although other circuitry configurations may also be suitable.

In some embodiments, the FEM circuitry 804a may include a TX/RX switch 902 to switch between transmit mode and receive mode operation. The FEM circuitry 804a may include a receive signal path and a transmit signal path.

The receive signal path of the FEM circuitry 804*a* may include a low-noise amplifier (LNA) 906 to amplify received RF signals 903 and provide the amplified received RF signals 907 as an output (e.g., to the radio IC circuitry 806*a-b* (FIG. 8)). The transmit signal path of the circuitry 804*a* may include a power amplifier (PA) to amplify input RF signals 909 (e.g., provided by the radio IC circuitry 806*a-b*), and one or more filters 912, such as band-pass filters (BPFs), low-pass filters (LPFs) or other types of filters, to generate RF signals 915 for subsequent transmission (e.g., by one or more of the antennas 801 (FIG. 8)) via an example duplexer 914.

In some dual-mode embodiments for Wi-Fi communication, the FEM circuitry 804*a* may be configured to operate in either the 2.4 GHz frequency spectrum or the 5 GHz frequency spectrum. In these embodiments, the receive signal path of the FEM circuitry 804*a* may include a receive signal path duplexer 904 to separate the signals from each spectrum as well as provide a separate LNA 906 for each spectrum as shown. In these embodiments, the transmit signal path of the FEM circuitry 904*a* may also include a power amplifier 910 and a filter 912, such as a BPF, an LPF or another type of filter for each frequency spectrum and a transmit signal path duplexer 904 to provide the signals of one of the different spectrums onto a single transmit path for subsequent transmission by the one or more of the antennas 801 (FIG. 8). In some embodiments, BT communications may utilize the 2.4 GHz signal paths and may utilize the same FEM circuitry 804*a* as the one used for WLAN communications.

Figure 10:
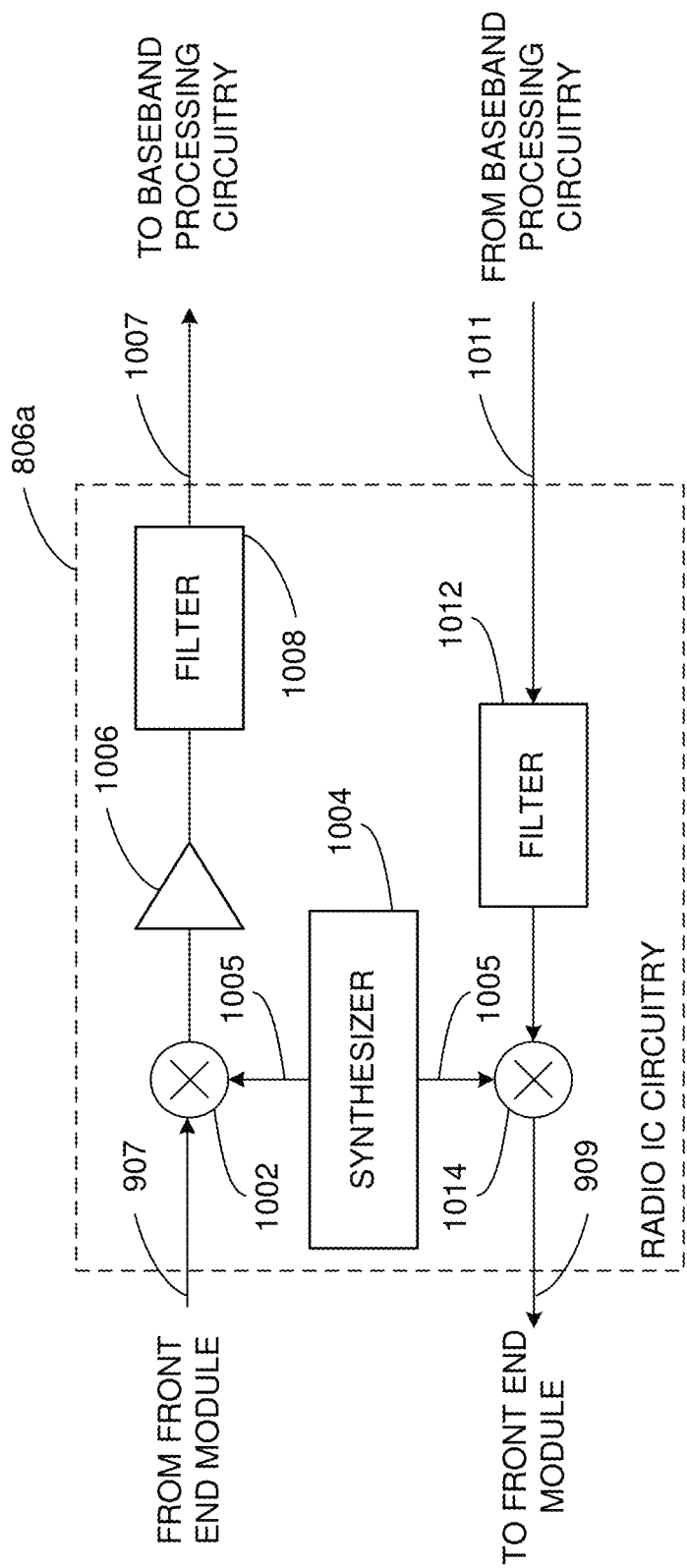
FIG. 10 illustrates an example radio IC circuitry for use in the radio architecture of FIG. 8, in accordance with one or more example embodiments of the present disclosure.

FIG. 10 illustrates radio IC circuitry 806*a* in accordance with some embodiments. The radio IC circuitry 806*a* is one example of circuitry that may be suitable for use as the WLAN or BT radio IC circuitry 806*a*/806*b* (FIG. 8), although other circuitry configurations may also be suitable. Alternatively, the example of FIG. 10 may be described in conjunction with the example BT radio IC circuitry 806*b*.

In some embodiments, the radio IC circuitry 806*a* may include a receive signal path and a transmit signal path. The receive signal path of the radio IC circuitry 806*a* may include at least mixer circuitry 1002, such as, for example, down-conversion mixer circuitry, amplifier circuitry 1006 and filter circuitry 1008. The transmit signal path of the radio IC circuitry 806*a* may include at least filter circuitry 1012 and mixer circuitry 1014, such as, for example, up-conversion mixer circuitry. Radio IC circuitry 806*a* may also include synthesizer circuitry 1004 for synthesizing a frequency 1005 for use by the mixer circuitry 1002 and the mixer circuitry 1014. The mixer circuitry 1002 and/or 1014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 10 illustrates only a simplified version of a radio IC circuitry, and may include, although not shown, embodiments where each of the depicted circuitries may include more than one component. For instance, mixer circuitry 1014 may each include one or more mixers, and filter circuitries 1008 and/or 1012 may each include one or more filters, such as one or more BPFs and/or LPFs according to application needs. For example, when mixer circuitries are of the direct-conversion type, they may each include two or more mixers.

In some embodiments, mixer circuitry 1002 may be configured to down-convert RF signals 907 received from the FEM circuitry 804*a-b* (FIG. 8) based on the synthesized frequency 1005 provided by synthesizer circuitry 1004. The amplifier circuitry 1006 may be configured to amplify the down-converted signals and the filter circuitry 1008 may include an LPF configured to remove unwanted signals from the down-converted signals to generate output baseband signals 1007. Output baseband signals 1007 may be provided to the baseband processing circuitry 808*a-b* (FIG. 8) for further processing. In some embodiments, the output baseband signals 1007 may be zero-frequency baseband signals, although this is not a requirement. In some embodiments, mixer circuitry 1002 may comprise passive mixers, although the scope of the embodiments is not limited in this respect.

In some embodiments, the mixer circuitry 1014 may be configured to up-convert input baseband signals 1011 based on the synthesized frequency 1005 provided by the synthesizer circuitry 1004 to generate RF output signals 1009 for the FEM circuitry 804*a-b*. The baseband signals 1011 may be provided by the baseband processing circuitry 808*a-b* and may be filtered by filter circuitry 1012. The filter circuitry 1012 may include an LPF or a BPF, although the scope of the embodiments is not limited in this respect.

In some embodiments, the mixer circuitry 1002 and the mixer circuitry 1014 may each include two or more mixers and may be arranged for quadrature down-conversion and/or up-conversion respectively with the help of synthesizer 1004. In some embodiments, the mixer circuitry 1002 and the mixer circuitry 1014 may each include two or more mixers each configured for image rejection (e.g., Hartley image rejection). In some embodiments, the mixer circuitry 1002 and the mixer circuitry 1014 may be arranged for direct down-conversion and/or direct up-conversion, respectively. In some embodiments, the mixer circuitry 1002 and the mixer circuitry 1014 may be configured for super-heterodyne operation, although this is not a requirement.

Mixer circuitry 1002 may comprise, according to one embodiment: quadrature passive mixers (e.g., for the in-phase (I) and quadrature phase (Q) paths). In such an embodiment, RF input signal 907 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1005 of synthesizer 1004 (FIG. 10). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 907 (FIG. 94) may comprise a balanced signal, although the scope of the embodiments is not limited in this respect. The I and Q baseband output signals may be provided to low-noise amplifier, such as amplifier circuitry 1006 (FIG. 10) or to filter circuitry 1008 (FIG. 10).

In some embodiments, the output baseband signals 1007 and the input baseband signals 1011 may be analog baseband signals, although the scope of the embodiments is not limited in this respect. In some alternate embodiments, the output baseband signals 1007 and the input baseband signals 1011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1004 may be a fractional-N synthesizer or a fractional N/N+1 synthesizer, although the scope of the embodiments is not limited in this respect as other types of frequency synthesizers may be suitable. For example, synthesizer circuitry 1004 may be a delta-sigma synthesizer, a frequency multiplier, or a synthesizer comprising a phase-locked loop with a frequency divider. According to some embodiments, the synthesizer circuitry 1004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1004 may be provided by a voltage controlled oscillator (VCO), although that is not a requirement. A divider control input may further be provided by either the baseband processing circuitry 808*a-b* (FIG. 8) depending on the desired output frequency 1005. In some embodiments, a divider control input (e.g., N) may be determined from a look-up table (e.g., within a Wi-Fi card) based on a channel number and a channel center frequency as determined or indicated by the example application processor 810. The application processor 810 may include, or otherwise be connected to, one of the example secure signal converter 101 or the example received signal converter 103 (e.g., depending on which device the example radio architecture is implemented in).

In some embodiments, synthesizer circuitry 1004 may be configured to generate a carrier frequency as the output frequency 1005, while in other embodiments, the output frequency 1005 may be a fraction of the carrier frequency (e.g., one-half the carrier frequency, one-third the carrier frequency). In some embodiments, the output frequency 1005 may be a LO frequency (fLO).

FIG. 11 illustrates a functional block diagram of baseband processing circuitry 808*a* in accordance with some embodiments. The baseband processing circuitry 808*a* is one example of circuitry that may be suitable for use as the baseband processing circuitry 808*a* (FIG. 8), although other circuitry configurations may also be suitable. Alternatively, the example of FIG. 11 may be used to implement the example BT baseband processing circuitry 808*b* of FIG. 8.

The baseband processing circuitry 808*a* may include a receive baseband processor (RX BBP) 1102 for processing receive baseband signals 909 provided by the radio IC circuitry 806*a-b* (FIG. 8) and a transmit baseband processor (TX BBP) 1104 for generating transmit baseband signals 1011 for the radio IC circuitry 806*a-b*. The baseband processing circuitry 808*a* may also include control logic 1106 for coordinating the operations of the baseband processing circuitry 808*a*.

In some embodiments (e.g., when analog baseband signals are exchanged between the baseband processing circuitry 808*a-b* and the radio IC circuitry 806*a-b*), the baseband processing circuitry 808*a* may include ADC 1110 to convert analog baseband signals 1109 received from the radio IC circuitry 806*a-b* to digital baseband signals for processing by the RX BBP 1102. In these embodiments, the baseband processing circuitry 808*a* may also include DAC 1112 to convert digital baseband signals from the TX BBP 1104 to analog baseband signals 1111.

In some embodiments that communicate OFDM signals or OFDMA signals, such as through baseband processor 808*a*, the transmit baseband processor 1104 may be configured to generate OFDM or OFDMA signals as appropriate for transmission by performing an inverse fast Fourier transform (IFFT). The receive baseband processor 1102 may be configured to process received OFDM signals or OFDMA signals by performing an FFT. In some embodiments, the receive baseband processor 1102 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 8, in some embodiments, the antennas 801 (FIG. 8) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 801 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Example 1 may be an apparatus of a device for performing Wi-Fi roaming operations comprising memory and processing circuitry configured to: generate, during a first association of the device to a first access point, a request to authenticate the device to a second access point; send, during the first association, the request to authenticate; receive, during the first association, a response indicating that the device is authenticated to the second access point; generate, during the first association, a reassociation request to the second access point; determine that a time between sending the request to authenticate and generating the reassociation request is less than a threshold time; send, based on the determination that the time is less than the threshold time, the reassociation request to the second access point;

and receive a reassociation response indicative of a second association of the device to the second access point.

Example 2 may include the apparatus of example 1 and/or some other example herein, wherein the request to authenticate is an 802.11 authentication request sent by the device to the second access point using an over-the-air protocol, and wherein the response indicating that the device is authenticated to the second access point is an 802.11 authentication response received by the device from the second access point using the over-the-air protocol.

Example 3 may include the apparatus of example 1 and/or some other example herein, wherein the request to authenticate is a first 802.11 fast transition frame sent by the device to the first access point using an over-the-distribution system protocol, and wherein the response indicating that the device is authenticated to the second access point is a second 802.11 fast transition frame received by the device from the first access point.

Example 4 may include the apparatus of example 1 and/or some other example herein, wherein the device is a multi-link device (MLD), wherein the first access point is a first access point MLD (A MLD), wherein the second access point is a second A MLD.

Example 5 may include the apparatus of example 4 and/or some other example herein, wherein the first association uses a first communication link between the MLD and the first A MLD, wherein the request to authenticate is an 802.11 authentication request sent from the MLD to the second A MLD over a second communication link using an over-the-air protocol, wherein the response indicating that the device is authenticated to the second access point is an 802.11 authentication response received from the second A MLD over the second communication link, wherein the reassociation response is received over the second communication link while the first communication link is maintained between the MLD and the first A MLD, and wherein the processing circuitry is further configured to: establish a first communication session between the MLD and the second A MLD over the second communication link; determine that no additional data is available to receive at the MLD from the first A MLD over the first communication link; and establish, based on the determination that no additional data is available to receive at the MLD from the first A MLD over the first communication link, a second communication session between the MLD and the second A MLD over the first communication link.

Example 6 may include the apparatus of example 4 and/or some other example herein, wherein the first association uses a first communication link between the MLD and the first A MLD, wherein the request to authenticate is a first 802.11 fast transition frame sent from the MLD to the first A MLD using an over-the-distribution system protocol, wherein the response indicating that the device is authenticated to the second access point is a second 802.11 fast transition frame received from the first A MLD over the first communication link, wherein the reassociation response is received over a second communication link while the first communication link is maintained between the MLD and the first A MLD, and wherein the processing circuitry is further configured to: establish a first communication session between the MLD and the second A MLD over the second communication link; determine that no additional data is available to receive at the MLD from the first A MLD over the first communication link; and establish, based on the determination that no additional data is available to receive at the MLD from the first A MLD over the first communication link, a second communication session between the MLD and the second A MLD over the first communication link.

Example 7 may include the apparatus of example 1 and/or some other example herein, further comprising a transceiver configured to transmit and receive wireless signals comprising the request to authenticate the device to a second access point, the response indicating that the device is authenticated to the second access point, the reassociation request, and the reassociation response.

Example 8 may include the apparatus of example 7 and/or some other example herein, further comprising one or more antennas coupled to the transceiver to transmit the reassociation request and the reassociation response.

Example 9 may include a non-transitory computer-readable medium storing computer-executable instructions which when executed by one or more processors result in performing operations comprising: generating, during a first association of a device to a first access point, a request to authenticate the device to a second access point; sending, during the first association, the request to authenticate; receiving, during the first association, a response indicating that the device is authenticated to the second access point; generating, during the first association, a reassociation request to the second access point; determining that a time between sending the request to authenticate and generating the reassociation request is less than a threshold time; sending, based on the determination that the time is less than the threshold time, the reassociation request to the second access point; and receiving a reassociation response indicative of a second association of the device to the second access point.

Example 10 may include the non-transitory computer-readable medium of example 9 and/or some other example herein, wherein the request to authenticate is an 802.11 authentication request sent by the device to the second access point using an over-the-air protocol, and wherein the response indicating that the device is authenticated to the second access point is an 802.11 authentication response received by the device from the second access point using the over-the-air protocol.

Example 11 may include the non-transitory computer-readable medium of example 9 and/or some other example herein, wherein the request to authenticate is a first 802.11 fast transition frame sent by the device to the first access point using an over-the-distribution system protocol, and wherein the response indicating that the device is authenticated to the second access point is a second 802.11 fast transition frame received by the device from the first access point.

Example 12 may include the non-transitory computer-readable medium of example 9 and/or some other example herein, wherein the device is a multi-link device (MLD), wherein the first access point is a first access point MLD (A MLD), wherein the second access point is a second A MLD.

Example 13 may include the non-transitory computer-readable medium of example 12 and/or some other example herein, wherein the first association uses a first communication link between the MLD and the first A MLD, wherein the request to authenticate is an 802.11 authentication request sent from the MLD to the second A MLD over a second communication link using an over-the-air protocol, wherein the response indicating that the device is authenticated to the second access point is an 802.11 authentication response received from the second A MLD over the second communication link, and wherein the reassociation response is received over the second communication link while the first communication link is maintained between the MLD and the first A MLD, the operations further comprising: establishing a first communication session between the MLD and the second A MLD over the second communication link; determining that no additional data is available to receive at the MLD from the first A MLD over the first communication link; and establishing, based on the determination that no additional data is available to receive at the MLD from the first A MLD over the first communication link, a second communication session between the MLD and the second A MLD over the first communication link.

Example 14 may include the non-transitory computer-readable medium of example 12 and/or some other example herein, wherein the first association uses a first communication link between the MLD and the first A MLD, wherein the request to authenticate is a first 802.11 fast transition frame sent from the MLD to the first A MLD using an over-the-distribution system protocol, wherein the response indicating that the device is authenticated to the second access point is a second 802.11 fast transition frame received from the first A MLD over the first communication link, and wherein the reassociation response is received over a second communication link while the first communication link is maintained between the MLD and the first A MLD, the operations further comprising: establishing a first communication session between the MLD and the second A MLD over the second communication link; determining that no additional data is available to receive at the MLD from the first A MLD over the first communication link; and establishing, based on the determination that no additional data is available to receive at the MLD from the first A MLD over the first communication link, a second communication session between the MLD and the second A MLD over the first communication link.

Example 15 may include a method for performing Wi-Fi roaming operations, the method comprising: generating, by processing circuitry of a first device, during a first association of the first device to a first access point, a request to authenticate the first device to a second access point; sending, by the processing circuitry, during the first association, the request to authenticate; receiving, by the processing circuitry, during the first association, a response indicating that the first device is authenticated to the second access point; generating, by the processing circuitry, during the first association, a reassociation request to the second access point; determining, by the processing circuitry, that a time between sending the request to authenticate and generating the reassociation request is less than a threshold time; sending, by the processing circuitry, based on the determination that the time is less than the threshold time, the reassociation request to the second access point; and receiving, by the processing circuitry, a reassociation response indicative of a second association of the first device to the second access point.

Example 16 may include the method of example 15 and/or some other example herein, wherein the request to authenticate is an 802.11 authentication request sent by the first device to the second access point using an over-the-air protocol, and wherein the response indicating that the first device is authenticated to the second access point is an 802.11 authentication response received by the first device from the second access point using the over-the-air protocol.

Example 17 may include the method of example 15 and/or some other example herein, wherein the request to authenticate is a first 802.11 fast transition frame sent by the first device to the first access point using an over-the-distribution system protocol, and wherein the response indicating that the first device is authenticated to the second access point is a second 802.11 fast transition frame received by the first device from the first access point.

Example 18 may include the method of example 15 and/or some other example herein, wherein the first device is a multi-link device (MLD), wherein the first access point is a first access point MLD (A MLD), wherein the second access point is a second A MLD.

Example 19 may include the method of example 18 and/or some other example herein, wherein the first association uses a first communication link between the MLD and the first A MLD, wherein the request to authenticate is an 802.11 authentication request sent from the MLD to the second A MLD over a second communication link using an over-the-air protocol, wherein the response indicating that the first device is authenticated to the second access point is an 802.11 authentication response received from the second A MLD over the second communication link, and wherein the reassociation response is received over the second communication link while the first communication link is maintained between the MLD and the first A MLD, the method further comprising: establishing a first communication session between the MLD and the second A MLD over the second communication link; determining that no additional data is available to receive at the MLD from the first A MLD over the first communication link; and establishing, based on the determination that no additional data is available to receive at the MLD from the first A MLD over the first communication link, a second communication session between the MLD and the second A MLD over the first communication link.

Example 20 may include the method of example 18 and/or some other example herein, wherein the first association uses a first communication link between the MLD and the first A MLD, wherein the request to authenticate is a first 802.11 fast transition frame sent from the MLD to the first A MLD using an over-the-distribution system protocol, wherein the response indicating that the first device is authenticated to the second access point is a second 802.11 fast transition frame received from the first A MLD over the first communication link, and wherein the reassociation response is received over a second communication link while the first communication link is maintained between the MLD and the first A MLD, the method further comprising: establishing a first communication session between the MLD and the second A MLD over the second communication link; determining that no additional data is available to receive at the MLD from the first A MLD over the first communication link; and establishing, based on the determination that no additional data is available to receive at the MLD from the first A MLD over the first communication link, a second communication session between the MLD and the second A MLD over the first communication link.

Example 21 may include an apparatus comprising means for: generating, during a first association of a first device comprising the apparatus to a first access point, a request to authenticate the first device to a second access point; sending, during the first association, the request to authenticate; receiving, during the first association, a response indicating that the first device is authenticated to the second access point; generating, during the first association, a reassociation request to the second access point; determining that a time between sending the request to authenticate and generating the reassociation request is less than a threshold time; sending, based on the determination that the time is less than the threshold time, the reassociation request to the second access point; and receiving a reassociation response indicative of a second association of the first device to the second access point.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus of a device for performing Wi-Fi roaming operations, the apparatus comprising processing circuitry coupled to storage, the processing circuitry configured to:
   generate, during a first association of the device to a first access point, a request to authenticate the device to a second access point, wherein the device is a multi-link device (MLD), wherein the first access point is a first access point MLD (A MLD), wherein the second access point is a second A MLD, and wherein the first association uses a first communication link between the MLD and the first A MLD;
   send, during the first association, the request to authenticate, wherein the request to authenticate is an 802.11 authentication request sent from the MLD to the second A MLD over a second communication link using an over-the-air protocol;
   receive, during the first association, a response indicating that the device is authenticated to the second access point, wherein the response indicating that the device is authenticated to the second access point is an 802.11 authentication response received from the second A MLD over the second communication link;
   generate, during the first association, a reassociation request to the second access point;
   determine that a time between sending the request to authenticate and generating the reassociation request is less than a threshold time during which generating the reassociation request is a condition for completing association to the second access point;
send, based on the determination that the time is less than the threshold time, the reassociation request to the second access point;
receive a reassociation response indicative of a second association of the device to the second access point, wherein the reassociation response is received over the second communication link while the first communication link is maintained between the MLD and the first A MLD;
establish a first communication session between the MLD and the second A MLD over the second communication link;
determine that no additional data is available to receive at the MLD from the first A MLD over the first communication link; and
establish, based on the determination that no additional data is available to receive at the MLD from the first A MLD over the first communication link, a second communication session between the MLD and the second A MLD over the first communication link.

2. The apparatus of claim 1, wherein the response indicating that the device is authenticated to the second access point is received using the over-the-air protocol.

3. The apparatus of claim 1, further comprising a transceiver configured to transmit and receive wireless signals comprising the request to authenticate the device to a second access point, the response indicating that the device is authenticated to the second access point, the reassociation request, and the reassociation response.

4. The apparatus of claim 3, further comprising an antenna coupled to the transceiver to transmit the reassociation request and the reassociation response.

5. A non-transitory computer-readable medium storing computer-executable instructions which when executed by one or more processors result in performing operations comprising:
generating, during a first association of a device to a first access point, a request to authenticate the device to a second access point, wherein the device is a multi-link device (MLD), wherein the first access point is a first access point MLD (A MLD), wherein the second access point is a second A MLD, and wherein the first association uses a first communication link between the MLD and the first A MLD;
sending, during the first association, the request to authenticate, wherein the request to authenticate is a first 802.11 fast transition frame sent from the MLD to the first A MLD using an over-the-distribution system protocol;
receiving, during the first association, a response indicating that the device is authenticated to the second access point, wherein the response indicating that the device is authenticated to the second access point is a second 802.11 fast transition frame received from the first A MLD over the first communication link;
generating, during the first association, a reassociation request to the second access point;
determining that a time between sending the request to authenticate and generating the reassociation request is less than a threshold time during which generating the reassociation request is a condition for completing association to the second access point;
sending, based on the determination that the time is less than the threshold time, the reassociation request to the second access point;
receiving a reassociation response indicative of a second association of the device to the second access point, wherein the reassociation response is received over a second communication link while the first communication link is maintained between the MLD and the first A MLD;
establishing a first communication session between the MLD and the second A MLD over the second communication link;
determining that no additional data is available to receive at the MLD from the first A MLD over the first communication link; and
establishing, based on the determination that no additional data is available to receive at the MLD from the first A MLD over the first communication link, a second communication session between the MLD and the second A MLD over the first communication link.

6. The non-transitory computer-readable medium of claim 5, wherein the request to authenticate is received using an over-the-air protocol.

7. A method for performing Wi-Fi roaming operations, the method comprising:
generating, by processing circuitry of a first device, during a first association of the first device to a first access point, a request to authenticate the first device to a second access point, wherein the device is a multi-link device (MLD), wherein the first access point is a first access point MLD (A MLD), wherein the second access point is a second A MLD, and wherein the first association uses a first communication link between the MLD and the first A MLD;
sending, by the processing circuitry, during the first association, the request to authenticate, wherein the request to authenticate is an 802.11 authentication request sent from the MLD to the second A MLD over a second communication link using an over-the-air protocol;
receiving, by the processing circuitry, during the first association, a response indicating that the first device is authenticated to the second access point, wherein the response indicating that the device is authenticated to the second access point is an 802.11 authentication response received from the second A MLD over the second communication link;
generating, by the processing circuitry, during the first association, a reassociation request to the second access point;
determining, by the processing circuitry, that a time between sending the request to authenticate and generating the reassociation request is less than a threshold time during which generating the reassociation request is a condition for completing association to the second access point;
sending, by the processing circuitry, based on the determination that the time is less than the threshold time, the reassociation request to the second access point;
receiving, by the processing circuitry, a reassociation response indicative of a second association of the first device to the second access point, wherein the reassociation response is received over the second communication link while the first communication link is maintained between the MLD and the first A MLD;
establishing, by the processing circuitry, a first communication session between the MLD and the second A MLD over the second communication link;

determining, by the processing circuitry, that no additional data is available to receive at the MLD from the first A MLD over the first communication link; and establishing, by the processing circuitry and based on the determination that no additional data is available to receive at the MLD from the first A MLD over the first communication link, a second communication session between the MLD and the second A MLD over the first communication link.

8. The method of claim 7, wherein the request to authenticate is received using the over-the-air protocol.

* * * * *